(12) United States Patent
Lin et al.

(10) Patent No.: US 10,771,813 B2
(45) Date of Patent: Sep. 8, 2020

(54) REFERENCE FRAME ENCODING METHOD AND APPARATUS, AND REFERENCE FRAME DECODING METHOD AND APPARATUS

(71) Applicant: Huawei Technologies Co., Ltd., Shenzhen (CN)

(72) Inventors: Sixin Lin, Shenzhen (CN); Xiang Zhang, Beijing (CN); Siwei Ma, Beijing (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 105 days.

(21) Appl. No.: 15/965,162

(22) Filed: Apr. 27, 2018

(65) Prior Publication Data
US 2018/0249177 A1    Aug. 30, 2018

Related U.S. Application Data

(63) Continuation of application No. PCT/CN2016/102027, filed on Oct. 13, 2016.

(30) Foreign Application Priority Data

Oct. 31, 2015 (CN) .......................... 2015 1 0731932

(51) Int. Cl.
*H04N 19/59* (2014.01)
*H04N 7/24* (2011.01)
(Continued)

(52) U.S. Cl.
CPC .............. *H04N 19/59* (2014.11); *H04N 7/24* (2013.01); *H04N 19/105* (2014.11);
(Continued)

(58) Field of Classification Search
None
See application file for complete search history.

(56) References Cited

U.S. PATENT DOCUMENTS

2003/0043912 A1    3/2003   Sun et al.
2003/0202591 A1    10/2003  Panusopone
(Continued)

FOREIGN PATENT DOCUMENTS

CN    101511017 A    8/2009
CN    102611885 A    7/2012
(Continued)

OTHER PUBLICATIONS

Machine Translation and Abstract of Chinese Publication No. CN102611885, dated Jul. 25, 2012, 27 pages.
(Continued)

*Primary Examiner* — Kate H Luo
(74) *Attorney, Agent, or Firm* — Conley Rose, P.C.

(57) ABSTRACT

A reference frame decoding method includes obtaining a first reference frame, where the first reference frame is a first picture frame on which decoding reconstruction has been performed or a first interpolated picture frame obtained by pixel interpolation on the first picture frame, parsing a bitstream to obtain mapping parameters, determining to-be-determined coefficients of a preset mapping function according to the mapping parameters, obtaining, in the first reference frame according to the mapping function whose to-be-determined coefficients have been determined, a first pixel unit having a mapping relationship with a second pixel unit of a second reference frame, and assigning a pixel value of the first pixel unit to the second pixel unit.

20 Claims, 10 Drawing Sheets

(51) Int. Cl.
*H04N 19/537* (2014.01)
*H04N 19/593* (2014.01)
*H04N 19/513* (2014.01)
*H04N 19/51* (2014.01)
*H04N 19/172* (2014.01)
*H04N 19/105* (2014.01)

(52) U.S. Cl.
CPC ........... *H04N 19/172* (2014.11); *H04N 19/51* (2014.11); *H04N 19/513* (2014.11); *H04N 19/537* (2014.11); *H04N 19/593* (2014.11)

(56) References Cited

U.S. PATENT DOCUMENTS

| | | | |
|---|---|---|---|
| 2004/0066848 A1* | 4/2004 | Jeon | H04N 19/521 375/240.15 |
| 2012/0106645 A1* | 5/2012 | Lin | H04N 19/577 375/240.16 |
| 2012/0218443 A1 | 8/2012 | Liu et al. | |
| 2013/0058397 A1* | 3/2013 | Song | H04N 19/105 375/240.02 |
| 2015/0117551 A1* | 4/2015 | Su | H04N 19/44 375/240.27 |
| 2017/0013279 A1* | 1/2017 | Puri | H04N 19/176 |

FOREIGN PATENT DOCUMENTS

| | | |
|---|---|---|
| CN | 103248891 A | 8/2013 |
| CN | 102622885 B | 6/2014 |
| CN | 103841298 A | 6/2014 |
| EP | 1449383 B1 | 6/2010 |
| WO | 9629828 A1 | 9/1996 |
| WO | 03019950 A1 | 3/2003 |
| WO | 2008123753 A1 | 10/2008 |

OTHER PUBLICATIONS

Machine Translation and Abstract of Chinese Publication No. CN103248891, dated Aug. 14, 2013, 10 pages.
"Series H: Audiovisual and Multimedia Systems Infrastructure of audiovisual services—Coding of moving video, Video coding for low bit rate communication," ITU-T H.263, Jan. 2005, 226 pages.
"Series H: Audiovisual and Multimedia Systems Infrastructure of audiovisual services—Coding of moving video, Advanced video coding for generic audiovisual services," ITU-T H.264, Feb. 2014, 790 pages.
"Series H: Audiovisual and Multimedia Systems Infrastructure of audiovisual services—Coding of moving video, High efficiency video coding," ITU-T H.265, Apr. 2015, 634 pages.
Foreign Communication From A Counterpart Application, PCT Application No. PCT/CN2016/102027, English Translation of International Search Report dated Jan. 3, 2017, 2 pages.
Machine Translation and Abstract of Chinese Publication No. CN101511017, dated Aug. 19, 2009, 17 pages.
Machine Translation and Abstract of Chinese Publication No. CN102622885, dated Jun. 11, 2014, 16 pages.
Machine Translation and Abstract of Chinese Publication No. CN103841298, dated Jun. 4, 2014, 14 pages.
Foreign Communication From A Counterpart Application, Chinese Application No. 201510731932.8, Chinese Office Action dated Dec. 14, 2018, 3 pages.
Foreign Communication From A Counterpart Application, Chinese Application No. 201510731932.8, Chinese Search Report dated Dec. 10, 2018, 2 pages.
Lin, S., et al., "Affine transform prediction for next generation video coding," XP044149659, C1016 R1-E, vol. 6116, Sep. 30, 2015, 11 pages.
Foreign Communication From A Counterpart Application, European Application No. 16858916.6, Extended European Search Report dated Jul. 16, 2018, 11 pages.

* cited by examiner

Picture sampling         DOG pyramid

REFERENCE FRAME ENCODING METHOD AND APPARATUS, AND REFERENCE FRAME DECODING METHOD AND APPARATUS

CROSS-REFERENCE TO RELATED APPLICATIONS

This application is a continuation of International Patent Application No. PCT/CN2016/102027 filed on Oct. 13, 2016, which claims priority to Chinese Patent Application No. 201510731932.8 filed on Oct. 31, 2015. The disclosures of the aforementioned applications are hereby incorporated by reference in their entireties.

TECHNICAL FIELD

The present application relates to the field of video image processing, and in particular, to a reference frame encoding method and apparatus, and a reference frame decoding method and apparatus.

BACKGROUND

Digital video capabilities can be incorporated into a wide range of apparatuses, including digital televisions, digital direct broadcast systems, wireless broadcast systems, personal digital assistants (PDAs), laptop or desktop computers, tablet computers, electronic book readers, digital cameras, digital recording apparatuses, digital media players, video gaming apparatuses, video game consoles, cellular or satellite radio telephones, video conferencing apparatuses, video streaming apparatuses, and the like. Digital video apparatuses implement video compression technologies such as video compression technologies described in standards defined by Moving Picture Experts Group (MPEG)-2, MPEG-4, International Telecommunication Union Telecommunication Standardization Sector (ITU-T) H.263, ITU-T H.264/MPEG-4 Part 10, Advanced Video coding (AVC), ITU-T H.265: the High Efficiency Video Coding (HEVC) standard, and extensions of such standards to transmit and receive digital video information more efficiently. By implementing such video coding technologies, a video apparatus can transmit, receive, encode, decode and/or store digital video information more efficiently.

In the field of video coding, a concept of a frame means an entire picture. After being formed into a video format frame by frame according to a particular sequence and frame rate, pictures may be played. When the frame rate reaches a particular rate, a time interval between two frames is less than a resolution limit of human eyes, transient persistence of vision occurs, and therefore the pictures appear to be moving on a screen. The basis on which a video file can be compressed is compression coding of a single-frame digital picture. A digitized picture has lots of repeatedly indicated information that is referred to as redundant information. A frame of picture usually has many parts having a same or similar spatial structure. For example, a close association and a similarity usually exist between colors of sampling points of a same object or background. In a multi-frame picture group, a great correlation basically exists between a frame of picture and a previous frame or a next frame of the frame of picture, and a difference between pixel values for describing information is very small. These are all parts that can be compressed. Similarly, the video file includes not only spatially redundant information but also lots of temporally redundant information. This is caused by a composition structure of a video. For example, a frame rate of video sampling is usually 25 frames/second to 30 frames/second. 60 frames/second may occur in a special case. That is, a sampling time interval between two neighboring frames is at least ⅟30 second to ⅟25 second. In such a short time, massive similar information basically exists in all pictures obtained by means of sampling, and a great association exists between the pictures. However, independent recording is performed in an original digital video recording system, and such features as continuity and similarity are not considered or used. Consequently, a quite large quantity of repeated and redundant data is caused. In addition, researches have indicated that a part that can be compressed, that is, visual redundancy, also exists in video information from the perspective of a psychological feature, that is, visual sensitivity of human eyes. The visual redundancy means properly compressing a video bit stream using a physiological property that human eyes are relatively sensitive to a luminance change but relatively insensitive to a chrominance change. In a high-luminance area, sensitivity of human eye vision to a luminance change presents a descending trend. The human eye vision turns to be relatively sensitive to an edge part of an object and relatively insensitive to an inner area, and relatively sensitive to an entire structure and relatively insensitive to a change of inner details. Video picture information is used to eventually serve humans. Therefore, compression processing may be performed on original video picture information by fully using these features of human eyes to achieve a more desirable compression effect. In addition to the spatial redundancy, the temporal redundancy, and the visual redundancy that are mentioned above, a series of redundant information such as redundancy of information entropy, structure redundancy, knowledge redundancy, and importance redundancy may exist in the video picture information. An objective of video compression encoding is to remove redundant information from a video sequence using various technologies and methods in order to reduce storage space usage and save transmission bandwidth.

In terms of the current state of technical development, a video compression processing technology mainly includes intra-frame prediction, inter-frame prediction, transform and quantization, entropy encoding, deblocking filtering processing, and the like. In an international universal range, there are mainly four types of mainstream compression coding schemes in existing video compression encoding standards, chroma subsampling, predictive coding, transform coding, and quantization coding.

Chroma subsampling: The scheme fully uses visual and psychological features of human eyes, and starts to attempt to maximally reduce, from bottom-layer data indication, a data volume described by a single element. Luminance-chrominance-chrominance (YUV) color coding is mostly used in a television system and is a standard widely used in a European television system. A YUV color space includes a luminance signal Y and two chrominance signals U and V. The three components are independent of each other. An indication manner in which YUV color modes are separate from each other is more flexible, occupies a small quantity of bandwidth for transmission, and is advantageous over a conventional red green blue (RGB) color model. For example, a YUV 4:2:0 form indicates that a quantity of two chrominance components U and V is only a half of a quantity of luminance components Y in both horizontal and vertical directions, that is, in four pixel sampling points, there are four luminance components Y and only one chrominance component U and one chrominance component V. In such indication, the data volume is further reduced and only accounts for 33% of an original data volume approximately. Achieving an objective of video compression in such a manner of chroma subsampling and using physiological and visual characteristics of human eyes is one of widely used video data compression manners at present.

Predictive coding: A current to-be-encoded frame is predicted using data information of a previously encoded frame. A predictor is obtained by means of prediction and is not exactly equal to an actual value. A residual value exists between the predictor and the actual value. When prediction is more appropriate, the predictor is closer to the actual value and the residual value is smaller. In this way, a data volume may be greatly reduced by encoding the residual value. An initial picture is restored or reconstructed by adding the residual value to the predictor during decoding on a decoder side. This is a basic concept and method of the predictive coding. In a mainstream coding standard, the predictive coding includes two basic types, intra-frame prediction and inter-frame prediction.

Transform coding: Original spatial-domain information is not directly encoded. Instead, a sample value of information is transformed from a current domain into another manually defined domain (which is usually referred to as a transform domain) according to a form of transform function, and then compression coding is performed according to a distribution feature of the information in the transform domain. A reason for the transform coding is that a data correlation of video picture data is usually large in a spatial domain, resulting in existence of massive redundant information. Consequently, direct encoding requires a large quantity of bits. The data correlation is greatly reduced in the transform domain such that redundant information for encoding is reduced, and a data volume needed for the encoding is greatly reduced accordingly. In this way, a relatively high compression ratio may be obtained, and a relatively desirable compression effect may be achieved. Typical transform coding includes Karhunen-Loeve (K-L) transform, Fourier transform, and the like. Integer discrete cosine transform (DCT) is a transform coding scheme commonly used in many international standards.

Quantization coding: Actually, data is not compressed in the transform coding mentioned above, and a quantization process is a powerful means for data compression and is a main reason for data "loss" in lossy compression. The quantization process is a process of forcibly planning an input value having a relatively large dynamic range into an output value having a relatively small dynamic range. A quantized input value has a relatively large range, and therefore requires a relatively large quantity of bits for indication, while an output value obtained after "forcible planning" has a relatively small range, and therefore requires only a small quantity of bits for indication. Each quantized input is normalized into a quantized output, that is, quantized into an order of magnitude. Such order of magnitude is usually referred to as a quantization level (which is usually specified by an encoder).

In a coding algorithm based on a hybrid coding architecture, the foregoing compression coding schemes are mixed for use. An encoder control module selects, according to local features of different picture blocks in a video frame, encoding modes used for the picture blocks. Frequency domain prediction or spatial domain prediction is performed on a block on which intra-frame prediction encoding is performed, and motion compensation prediction is performed on a block on which inter-frame prediction encoding is performed. Then, transform and quantization processing is performed on a predicted residual to form a residual coefficient. At last, a final bitstream is generated using an entropy encoder. To avoid accumulation of prediction errors, a reference signal of intra-frame prediction or inter-frame prediction is obtained using a decoding module on an encoder side. Dequantization and an inverse transform are performed on the residual coefficient obtained after the transform and quantization, to reconstruct a residual signal. The residual signal is then added to the reference signal of prediction to obtain a reconstructed picture. Pixel correction is performed on the reconstructed picture by means of loop filtering in order to improve encoding quality of the reconstructed picture.

SUMMARY

The present application discloses a reference frame encoding method and a reference frame decoding method in order to improve encoding efficiency.

Motion compensation is one of key technologies in video encoding for improving compression efficiency. Conventional motion compensation based on block matching is a method widely applied to mainstream video encoders, and especially, in video encoding standards. In the motion compensation method based on block matching, a translational motion model is used for an inter-prediction block. In the translational motion model, it is assumed that motion vectors in all pixel positions in a block are equal. However, this assumption is invalid in many cases. Actually, a motion of an object in a video is usually a complex combination of motions such as translation, rotation, and zoom. If a pixel block includes these complex motions, a prediction signal that is obtained using the conventional motion compensation method based on block matching is inaccurate. Consequently, inter-frame correlation cannot be completely removed. To resolve the problem, a high-order motion model is introduced to the motion compensation in the video encoding. The high-order motion model has greater freedom than the translational motion model, and allows pixels in an inter-prediction block to have different motion vectors. That is, a motion vector field generated by means of the high-order motion model is more accurate.

An affine motion model described based on a control point is a representative type of high-order motion model. Different from the conventional translational motion model, a value of a motion vector of each pixel point in a block is related to its position, and is a first-order linear equation of a coordinate position. The affine motion model allows a warping transform such as rotation or zoom of a reference block, and a more accurate prediction block can be obtained by means of the motion compensation.

An affine mode may better improve a precision value of a prediction block and improve encoding efficiency. However, on the other hand, for the affine mode, more bit rates need to be consumed to encode motion information of control points than those needed for uniform motion information based on the translational motion model. In addition, because a quantity of candidate prediction modes increases, a bit rate used to encode a result of selection from the prediction modes also increases. Such additional bit rate consumption all hinders improvement of the encoding efficiency.

According to a first aspect of the present application, a reference frame decoding method is disclosed, including decoding a received video bitstream on a decoder side such that in a process of performing decoding reconstruction on a picture frame, a picture frame on which decoding reconstruction has been performed needs to be used as a reference frame of a current to-be-decoded frame, and decoding reconstruction on the current to-be-decoded frame is completed with reference to the reference frame. Not all picture frames on which decoding reconstruction has been performed are used as a reference frame of the current to-be-decoded frame, and only a picture reference frame on which decoding reconstruction has been performed and that is stored in a reference frame list is used as the reference frame for selection and use by the current to-be-decoded frame. A reference frame in the reference frame list is also referred to as a candidate reference frame of the current to-be-decoded frame. The reference frame list is updated as a to-be-decoded frame is decoded. In some embodiments, after decoding reconstruction has been performed on the to-be-decoded frame, the to-be-decoded frame is added to the reference frame list and used as a reference frame of a subsequent to-be-decoded frame.

It may be assumed that decoding reconstruction has been performed on the current to-be-decoded frame. Optionally, pixel interpolation may be performed on the picture frame on which decoding reconstruction has been performed. A method for the pixel interpolation includes single-frame picture sub-pixel interpolation and multi-frame motion estimation interpolation, both of which aim to improve precision of a picture on which decoding reconstruction has been performed as a reference picture during motion estimation. This is not limited. The frame on which decoding reconstruction has been performed or a frame obtained after the pixel interpolation is performed on the frame on which decoding reconstruction has been performed may be referred to as a first reference frame.

A bitstream is parsed to obtain mapping parameters. Usually, a quantity of mapping parameters is not less than 2. The mapping parameters are encoded into the bitstream on an encoder side. The decoder side parses, using an operation rule followed by both the encoder side and the decoder side, the bitstream to obtain the mapping parameters in a decoding scheme corresponding to an encoding scheme on the encoder side.

It should be understood that such mapping parameters are transferred at a frame level, may be transferred in a picture parameter set (PPS), may be transferred in a slice header, or may be transferred as another frame-level syntactic element. This is not limited.

A mapping function is preset according to empirical or experimental data. The mapping function reflects a location mapping relationship between any point in a to-be-generated reference frame which may be referred to as a second reference frame and a pixel unit in the first reference frame. In some embodiments, an output of the mapping function is a location of a target pixel unit, and an input is a location of a source pixel unit and a to-be-determined parameter. Therefore, the mapping function indicating the location mapping relationship between any point in the second reference frame and the pixel unit in the first reference frame may be established with reference to the mapping parameters obtained from the bitstream.

It should be understood that a pixel unit may be a pixel point, or a set of several neighboring pixel points in a plane location, for example, a set of 2*2 pixel points. This is not limited. Correspondingly, a location of the pixel unit may be indicated by a location of an upper-left pixel point in the pixel unit, a location of a pixel point in the middle of a pixel set, or a location of any preset pixel point. In this embodiment of the present application, a coordinate location of the pixel unit is usually a coordinate location of the upper-left pixel point in the pixel unit.

Under derivation of the mapping function, for each point in the second reference frame, a mapping point that is in the first reference frame and that is of the point may be found, and a pixel value of the mapping point is obtained as a pixel value of the point. When such step is performed on each point in the second reference frame, the second reference frame is generated. It should be understood that the pixel unit participates, as a whole, in a process of determining the mapping point. A pixel value of each pixel point in the pixel unit of the mapping point is assigned to each mapped pixel point in a pixel unit in the second reference frame.

In an embodiment, the mapping function described above is $x'=m_0x+m_1y+m_2$, $y'=m_3x+m_4y+m_5$, x, y are a horizontal coordinate and a vertical coordinate of the source pixel unit, x', y' are a horizontal coordinate and a vertical coordinate of the target pixel unit having the mapping relationship with the source pixel unit x, y, and $m_0,m_1,m_2,m_3,m_4,m_5$ are the mapping parameters. Correspondingly, obtaining, in the first reference frame according to the mapping function whose undetermined coefficients have been determined, a first pixel unit having a mapping relationship with a second pixel unit of a second reference frame includes in the first reference frame, a location of the first pixel unit is $x'=m_0x+m_1y+m_2$, $y'=m_3x+m_4y+m_5$, x, y are a horizontal coordinate and a vertical coordinate of the second pixel unit, and x', y' are a horizontal coordinate and a vertical coordinate of the first pixel unit having the mapping relationship with the second pixel unit. It should be understood that in this embodiment, a six-parameter mapping function is used. Patent applications such as No. CN201010247275.7, CN201410584175.1, CN201410526608.8, CN201510085362.X, PCT/CN2015/073969, CN201510249484.8, CN201510391765.7, and CN201510543542.8 are incorporated herein by reference in their entireties and disclose mapping functions using other parameters such as two parameters, four parameters, and eight parameters. This is not limited. It should be understood that a quantity of the mapping parameters obtained by parsing the bitstream should be consistent with a quantity of to-be-determined coefficients needed for the corresponding mapping function.

The generated second reference frame can be selected and used by a subsequent to-be-decoded frame only after the generated second reference frame is added to the reference frame list. Encoding efficiency may be improved by efficiently designing a composition policy of the reference frame list. Otherwise, if an inappropriate reference frame is selected to be added to the reference frame list, the encoding efficiency may be reduced.

In an embodiment, the picture frame on which decoding reconstruction has been performed and the second reference frame are added to the reference frame list in a neighboring location relationship.

In an embodiment, only the second reference frame is added to the reference frame list.

In an embodiment, for multiple picture frames on which decoding reconstruction has been performed, usually, a quantity of the multiple picture frames is not less than 2 and may be, for example, 2, and the second reference frame and a fourth reference frame are generated according to the method in the first aspect of the present application. Weighted addition is performed on pixel units corresponding to the second reference frame and the fourth reference frame to obtain a new reference frame which may be referred to as a fifth reference frame. It should be understood that a weighted value of the weighted addition herein may be set according to indicators such as different quality and different reliabilities of the reference frames. This is not limited. For example, an average value of the pixel units corresponding to the second reference frame and the fourth reference frame may be calculated. The picture frame on which decoding reconstruction has been performed or the fifth reference frame is added to the reference frame list. Alternatively, the picture frame on which decoding reconstruction has been performed and the fifth reference frame may be both added to the reference frame list.

In an embodiment, a region in the first reference frame is arbitrarily selected. For example, the entire first reference frame may be selected, and then the region is a matrix whose vertexes are four vertexes of the first reference frame. Alternatively, a region of any shape may be arbitrarily obtained in the first reference frame. This is not limited. A region covered by the entire first reference frame may be referred to as a first region. Locations of four scatters that are in the second reference frame and that correspond to the four vertexes of the first region are calculated according to the mapping function in the first aspect of the present application. The four scatters are connected according to a connection relationship of the four vertexes of the first region in order to encircle a region in the second reference frame. The encircled region may be set as a second region. In a coordinate plane location relationship, an overlapped part and a non-overlapped part exist in coverage of the first region and the second region. The overlapped part is referred to as an intersection of the first region and the second region. The non-overlapped part in the coverage of the first region and the second region and the intersection are referred to as a union of the first region and the second region. A ratio of an area of the intersection to an area of the union is calculated. When the ratio is less than a preset value, the second reference frame is added to the reference frame list, otherwise, the picture frame on which decoding reconstruction has been performed is added to the reference frame list. It should be understood that an objective of the solution is to determine a difference between the picture frame on which decoding reconstruction has been performed and the second reference frame. When the difference is relatively small, the picture frame on which decoding reconstruction has been performed is added to the reference frame list. When the difference is relatively large, the second reference frame is added to the reference frame list. To achieve the objective, an implementation means is not limited.

In an embodiment, the picture frame on which decoding reconstruction has been performed and the second reference frame in the previous embodiment are both added to the reference frame list. For a subsequent to-be-decoded frame, consistent with a plane location of the intersection of the first region and the second region in the previous embodiment, correspondingly, the to-be-decoded frame includes a region in a corresponding intersection and a region outside the corresponding intersection. In an example of a first implementation, for a pixel unit in the region of the to-be-decoded frame in the corresponding intersection, refer to all picture frames that are in the reference frame list and on which decoding reconstruction has been performed, but not refer to the second reference frame in the reference frame list. For a pixel unit in the region of the to-be-decoded frame outside the corresponding intersection, refer to all the picture frames that are in the reference frame list and on which decoding reconstruction has been performed, or refer to the second reference frame in the reference frame list. In an example of a second implementation, for a pixel unit in the region of the to-be-decoded frame in the corresponding intersection, refer to all picture frames that are in the reference frame list and on which decoding reconstruction has been performed, but not refer to the second reference frame in the reference frame list. For a pixel unit in the region of the to-be-decoded frame outside the corresponding intersection, not refer to all the picture frames that are in the reference frame list and on which decoding reconstruction has been performed, but refer to the second reference frame in the reference frame list.

Compared with methods provided in patents such as No. CN201010247275.7 in the foregoing quotation, in the present application, only a small quantity of mapping parameters is transmitted at a frame level, and selectivity of reference frames is enriched such that a reference frame is closer to an actual frame, and prediction performed using the reference frame is more accurate, thereby improving encoding efficiency.

According to a second aspect of the present application, another reference frame decoding method is disclosed, including decoding a bitstream to obtain indication information after decoding reconstruction is performed on a current to-be-decoded frame and before a reference frame list is processed, where the indication information indicates whether to use a picture frame on which decoding reconstruction has been performed as a reference frame, that is, not considering a reference frame generated using the method provided in the first aspect of the present application, and if the indication information indicates that only the picture frame on which decoding reconstruction has been performed is used as the reference frame, only setting the picture frame on which decoding reconstruction has been performed as the reference frame, otherwise, setting, as the reference frame, a reference frame generated using the method described in the first aspect and the embodiments of the present application.

It should be understood that the indication information is transferred at a frame level, may be transferred in a PPS, may be transferred in a slice header, or may be transferred as another frame-level syntactic element. This is not limited.

In an optional implementation, the indication information may further be transferred at a sequence level, for example, in a sequence parameter set (SPS) to indicate whether only the picture frame on which decoding reconstruction has been performed is used as a reference frame in an entire belonging sequence. Further, the indication information may indicate information of each frame in the sequence about reference frame construction. For example, indicating a frame number four represents that a reference frame generated according to the method described in the first aspect and the embodiments of the present application is added to the reference frame list, and a number of the reference frame is 4. Alternatively, for example, indicating a binary sequence 011101 represents a case of a construction manner of each frame that is in the sequence and that is added to the reference frame list.

Because of diversity of source video content, for some video content, a desirable encoding effect may be achieved using only a picture frame on which decoding reconstruction has been performed as a reference frame. Using the indication information, it is known in advance whether a reference frame generated using the method provided in the first aspect of the present application needs to be generated in order to reduce complexity of the solution.

According to a third aspect of the present application, a reference frame encoding method is disclosed, further including obtaining an original to-be-encoded picture frame and a candidate reference frame currently in a reference frame sequence, and separately extracting feature points of the original picture frame and the obtained candidate reference frame. There are multiple methods for extracting and matching a feature point, including a visual feature, a statistical feature, a transform coefficient feature, an algebraic feature, and the like of a picture. Correspondingly, a feature extraction method includes a principal component analysis method, a support vector machine, and the like. The document Researches on Picture Feature Extraction method (Digital Object Identifier (DOI): CNKI:CDMD: 2.2007.058439) is incorporated herein in its entirety. A picture feature and an extraction method are described as an example in chapter one and chapter two of the document. A feature point extraction and matching method used in this embodiment of the present application is not limited. Usually, a preset mapping function is the same as the mapping function used in the first aspect of the present application. Several feature points in a set of first feature points and mapped feature points that are in a set of second feature points and that have a same quantity as that of the several feature points may mutually be the source pixel unit and the target pixel unit of the mapping function disclosed in the first aspect of the present application in order to calculate mapping parameters. Corresponding to the parsing a bitstream to obtain mapping parameters in the first aspect of the present application, the calculated mapping parameters are encoded into the bitstream. A reference frame list on an encoder side needs to be consistent with a reference frame list on a decoder side. Therefore, the encoder side performs a same operation as that on the decoder side, and generates, based on a picture frame on which encoding reconstruction has been performed and the mapping function mentioned above, a reference frame similar to the second reference frame in the first aspect of the present application. Optionally, pixel interpolation may be performed on the picture frame on which encoding reconstruction has been performed. Correspondingly, each embodiment on the decoder side that may be implemented in the first aspect of the present application may also be implemented on the encoder side in the third aspect of the present application.

Compared with methods provided in patents such as No. CN201010247275.7 in the foregoing quotation, in the present application, only a small quantity of mapping parameters is transmitted at a frame level, and selectivity of reference frames is enriched such that a reference frame is closer to an actual frame, and prediction performed using the reference frame is more accurate, thereby improving encoding efficiency.

According to a fourth aspect of the present application, another reference frame encoding method is disclosed, including separately setting a reference frame generated according to the method provided in the third aspect of the present application and a picture frame on which decoding reconstruction has been performed as a reference frame to test encoding performance after encoding reconstruction is performed on a current to-be-encoded frame and before a reference frame list is processed. It should be understood that the foregoing encoding performance test is a process of encoding quality-encoding cost (distortion-rate) selection. Comparison may be performed according to accurate encoding quality and an accurate quantity of encoding bits or may be performed in a simplified manner. For example, only a quantity of encoding bits is tested. This is not limited. If higher encoding performance may be obtained using the reference frame generated using the method provided in the third aspect of the present application, encoding is performed according to the method in the third aspect and the embodiments of the present application, and corresponding to the parsing a bitstream to obtain indication information in the second aspect of the present application, selection information is encoded into the bitstream, otherwise, encoding is performed using the picture frame on which decoding reconstruction has been performed as the reference frame, and corresponding to the parsing a bitstream to obtain indication information in the second aspect of the present application, selection information also needs to be encoded into the bitstream.

It should be understood that the selection information is transferred at a frame level, may be transferred in a PPS, may be transferred in a slice header, or may be transferred as another frame-level syntactic element. This is not limited.

Corresponding to an implementation on a decoder side, indication information may further be encoded at a sequence level, for example, in an SPS to indicate whether only the picture frame on which decoding reconstruction has been performed is used as a reference frame in an entire belonging sequence. Further, the indication information may indicate information of each frame in the sequence about reference frame construction. For example, indicating a frame number four represents that a reference frame generated according to the method described in the first aspect and the embodiments of the present application is added to the reference frame list, and a number of the reference frame is 4. Alternatively, for example, indicating a binary sequence 011101 represents a case of a construction manner of each frame that is in the sequence and that is added to the reference frame list.

Because of diversity of source video content, for some video content, a desirable encoding effect may be achieved using only a picture frame on which encoding reconstruction has been performed as a reference frame. Using the selection information, the decoder side is notified in advance of whether a reference frame generated using the method provided in the third aspect of the present application needs to be generated in order to reduce complexity of the solution.

According to a fifth aspect of the present application, a reference frame decoding apparatus is disclosed, including a first obtaining module configured to obtain a first reference frame, where the first reference frame is a first picture frame on which decoding reconstruction has been performed or a first interpolated picture frame obtained by means of pixel interpolation on the first picture frame, a parsing module configured to parse a bitstream to obtain mapping parameters, a second obtaining module configured to determine to-be-determined coefficients of a preset mapping function according to the mapping parameters, a third obtaining module configured to obtain, in the first reference frame according to the mapping function whose to-be-determined coefficients have been determined, a first pixel unit having a mapping relationship with a second pixel unit of a second reference frame, and an assignment module configured to assign a pixel value of the first pixel unit to the second pixel unit.

According to a sixth aspect of the present application, another reference frame decoding apparatus is disclosed, including a first parsing module configured to parse a bitstream to obtain indication information, a selection module configured to when the indication information indicates not to construct, based on a picture frame on which decoding reconstruction has been performed, another reference frame, use the picture frame on which decoding reconstruction has been performed as the reference frame, otherwise, set the following method to obtain the reference frame, a first obtaining module configured to obtain a first reference frame, where the first reference frame is the picture frame on which decoding reconstruction has been performed or an interpolated picture frame obtained by means of pixel interpolation on the picture frame, a second parsing module configured to parse the bitstream to obtain mapping parameters, a second obtaining module configured to determine to-be-determined coefficients of a preset mapping function according to the mapping parameters, a third obtaining module configured to obtain, in the first reference frame according to the mapping function whose to-be-determined coefficients have been determined, a first pixel unit having a mapping relationship with a second pixel unit of a second reference frame, and an assignment module configured to assign a pixel value of the first pixel unit to the second pixel unit.

According to a seventh aspect of the present application, a reference frame encoding apparatus is disclosed, including a first obtaining module configured to obtain a to-be-encoded picture frame and a candidate reference frame of a picture frame on which encoding reconstruction has been performed and that corresponds to the to-be-encoded picture frame, a second obtaining module configured to separately extract a set of a first feature point of the to-be-encoded picture frame and a set of a second feature point of the candidate reference frame, a third obtaining module configured to obtain mapping parameters according to the set of the first feature point, the set of the second feature point, and a preset mapping function, where the mapping parameters indicate a mapping relationship between the first feature point and the second feature point under constraint of the mapping function, an encoding module configured to encode the mapping parameters into a bitstream, a fourth obtaining module configured to obtain a first reference frame, where the first reference frame is a first picture frame on which encoding reconstruction has been performed or a first interpolated picture frame obtained by means of pixel interpolation on the first picture frame, a fifth obtaining module configured to determine to-be-determined coefficients of the mapping function according to the mapping parameters, a sixth obtaining module configured to obtain, in the first reference frame according to the mapping function whose to-be-determined coefficients have been determined, a first pixel unit having the mapping relationship with a second pixel unit of a second reference frame, and an assignment module configured to assign a pixel value of the first pixel unit to the second pixel unit.

According to an eighth aspect of the present application, another reference frame encoding apparatus is disclosed, including a first obtaining module configured to obtain a to-be-encoded picture frame and a candidate reference frame of a picture frame on which encoding reconstruction has been performed and that corresponds to the to-be-encoded picture frame, a second obtaining module configured to separately extract a set of a first feature point of the to-be-encoded picture frame and a set of a second feature point of the candidate reference frame, a third obtaining module configured to obtain mapping parameters according to the set of the first feature point, the set of the second feature point, and a preset mapping function, where the mapping parameters indicate a mapping relationship between the first feature point and the second feature point under constraint of the mapping function, a first encoding module configured to encode the mapping parameters into a bitstream, a fourth obtaining module configured to obtain a first reference frame, where the first reference frame is a first picture frame on which encoding reconstruction has been performed or a first interpolated picture frame obtained by means of pixel interpolation on the first picture frame, a fifth obtaining module configured to determine to-be-determined coefficients of the mapping function according to the mapping parameters, a sixth obtaining module configured to obtain, in the first reference frame according to the mapping function whose to-be-determined coefficients have been determined, a first pixel unit having the mapping relationship with a second pixel unit of a second reference frame, an assignment module configured to assign a pixel value of the first pixel unit to the second pixel unit, a first calculation module configured to calculate first encoding performance of the second reference frame as the reference frame, a second calculation module configured to calculate second encoding performance of the encoded picture frame as the reference frame, a second encoding module configured to encode comparison information of the first encoding performance and the second encoding performance into the bitstream, and a comparison module configured to when the comparison information indicates that the first encoding performance is superior to the second encoding performance, use the second reference frame as the reference frame, otherwise, use the picture frame on which encoding reconstruction has been performed as the reference frame.

According to a ninth aspect of the present application, a device configured to decode a reference frame is disclosed. The device includes a processor configured to perform an operation method described in the first aspect.

According to a tenth aspect of the present application, another device configured to decode a reference frame is disclosed. The device includes a processor configured to perform an operation method described in the second aspect.

According to an eleventh aspect of the present application, a device configured to encode a reference frame is disclosed. The device includes a processor configured to perform an operation method described in the third aspect.

According to a twelfth aspect of the present application, another device configured to encode a reference frame is disclosed. The device includes a processor configured to perform an operation method described in the fourth aspect.

According to a thirteenth aspect of the present application, a computer readable storage medium storing an instruction is disclosed. The instruction, when being executed, causes one or more processors of a device configured to decode a reference frame to perform an operation method described in the first aspect.

According to a fourteenth aspect of the present application, another computer readable storage medium storing an instruction is disclosed. The instruction, when being executed, causes one or more processors of a device configured to decode a reference frame to perform an operation method described in the second aspect.

According to a fifteenth aspect of the present application, a computer readable storage medium storing an instruction is disclosed. The instruction, when being executed, causes one or more processors of a device configured to encode a reference frame to perform an operation method described in the third aspect.

According to a sixteenth aspect of the present application, another computer readable storage medium storing an instruction is disclosed. The instruction, when being executed, causes one or more processors of a device configured to encode a reference frame to perform an operation method described in the fourth aspect.

In conclusion, in the present application, only a small quantity of mapping parameters is transmitted at a frame level, and selectivity of reference frames is enriched such that a reference frame is closer to an actual frame, and prediction performed using the reference frame is more accurate, thereby improving encoding efficiency.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

Figure 1:
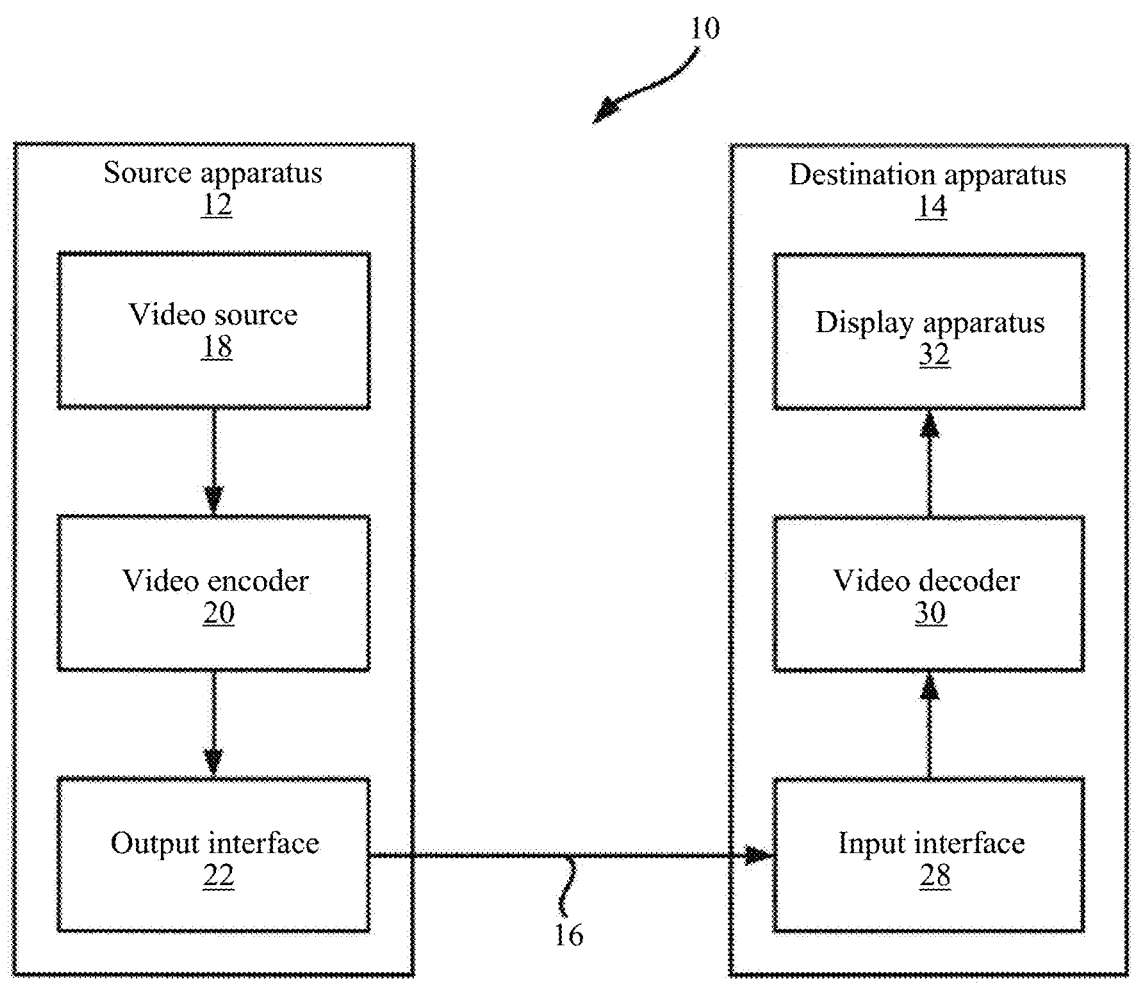
FIG. 1 is a schematic block diagram of a video coding system according to an embodiment of the present application.

FIG. 1 is a schematic block diagram of a video coding system 10 according to an embodiment of the present application. As shown in FIG. 1, the video coding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of a video coding apparatus or a video coding device. The source apparatus 12 and the destination apparatus 14 may include a wide range of apparatuses, including a desktop computer, a mobile computing apparatus, a notebook (for example, laptop) computer, a tablet computer, a set-top box, a handset such as a smart phone, a television, a camera, a display apparatus, a digital media player, a video game console, a vehicle-mounted computer, or other similar apparatuses.

The destination apparatus 14 may receive, using a channel 16, the encoded video data from the source apparatus 12. The channel 16 may include one or more media and/or apparatuses that can move the encoded video data from the source apparatus 12 to the destination apparatus 14. In an example, the channel 16 may include one or more communications media that enable the source apparatus 12 to directly transmit the encoded video data to the destination apparatus 14 in real time. In the example, the source apparatus 12 may modulate the encoded video data according to a communication standard (for example, a wireless communication protocol), and may transmit modulated video data to the destination apparatus 14. The one or more communications media may include a wireless communications medium and/or a wired communications medium, for example, a radio frequency (RF) spectrum or one or more physical transmission lines. The one or more communications media may form a part of a packet-based network (for example, a local area network, a wide area network, or a global network (for example, Internet)). The one or more communications media may include a router, a switch, a base station, or another device facilitating communication from the source apparatus 12 to the destination apparatus 14.

In another example, the channel 16 may include a storage medium storing the encoded video data generated by the source apparatus 12. In the example, the destination apparatus 14 may access the storage medium by means of disk access or card access. The storage medium may include multiple types of local access-type data storage media such as a BLU-RAY DISC, a digital versatile disc (DVD), a compact disc read-only memory (CD-ROM), or a flash memory, or another suitable digital storage medium configured to store the encoded video data.

In another example, the channel 16 may include a file server or another intermediate storage apparatus storing the encoded video data generated by the source apparatus 12. In the example, the destination apparatus 14 may access, by means of streaming transmission or downloading, the encoded video data stored in the file server or the other intermediate storage apparatus. The file server may be of a server type that can store the encoded video data and transmit the encoded video data to the destination apparatus 14. An example of the file server includes a web server (for example, used for a website), a File Transfer Protocol (FTP) server, a network-attached storage (NAS) apparatus, and a local disk drive.

The destination apparatus 14 may access the encoded video data by means of a standard data connection (for example, an Internet connection). An example type of the data connection includes a radio channel (for example, a WI-FI connection) that is suitable for accessing the encoded video data stored in the file server, a wired connection (for example, a digital subscriber line (DSL) or a cable modem), or a combination of the radio channel and the wired connection. Transmission of the encoded video data from the file server may be streaming transmission, downloading transmission, or a combination of the streaming transmission and the downloading transmission.

A technology of the present application is not limited to a wireless application scenario. For example, the technology may be applied to video coding supporting multiple multimedia applications such as, over-the-air television broadcasting, cable television transmission, satellite television transmission, streaming-transmission video transmission (for example, by means of the Internet), encoding of video data stored in a data storage medium, decoding of video data stored in a data storage medium, or another application. In some examples, the video coding system 10 may be configured to support unidirectional or bidirectional video transmission in order to support applications such as video streaming transmission, video playing, video broadcasting, and/or videotelephony.

In the example in FIG. 1, the source apparatus 12 includes a video source 18, a video encoder 20, and an output interface 22. In some examples, the output interface 22 may include a modulator/demodulator (modem) and/or a transmitter. The video source 18 may include a video capture apparatus (for example, a video camera), a video archive including pre-captured video data, a video input interface configured to receive video data from a video content provider, and/or a computer graphics system configured to generate video data, or a combination of the foregoing video data sources.

The video encoder 20 may encode video data from the video source 18. In some examples, the source apparatus 12 directly transmits encoded video data to the destination apparatus 14 using the output interface 22. The encoded video data may further be stored in a storage medium or a file server such that the destination apparatus 14 accesses the encoded video data later for decoding and/or playing.

In the example in FIG. 1, the destination apparatus 14 includes an input interface 28, a video decoder 30, and a display apparatus 32. In some examples, the input interface 28 includes a receiver and/or a modem. The input interface 28 may receive the encoded video data using the channel 16. The display apparatus 32 may be integrated with the destination apparatus 14 or may be outside the destination apparatus 14. Usually, the display apparatus 32 displays decoded video data. The display apparatus 32 may include multiple types of display apparatuses such as a liquid crystal display (LCD), a plasma display, an organic light-emitting diode (OLED) display, or a display apparatus of another type.

The video encoder 20 and the video decoder 30 may perform operations according to a video compression standard (for example, a high efficiency video coding H.265 standard), and may comply with an HEVC test model (HM). Text description ITU-T H.265(V3) (April 2015) of the H.265 standard was released on Apr. 29, 2015, and may be downloaded from http://handle.itu.int/11.1002/1000/12455. The file is incorporated in this specification by reference in its entirety.

Alternatively, the video encoder 20 and the video decoder 30 may perform operations according to another dedicated or industrial standard. The standard includes ITU-T H.261, International Organization for Standardization (ISO)/International Electrotechnical Commission (IEC) MPEG-1 Visual, ITU-T H.262 or ISO/IEC MPEG-2 Visual, ITU-T H.263, ISO/IEC MPEG-4 Visual, or ITU-T H.264 (which is also referred to as ISO/IEC MPEG-4 AVC), and includes Scalable Video Coding (SVC) and Multiview Video Coding (MVC) extensions. It should be understood that the technology of the present application is not limited to any particular encoding and decoding standard or technology.

In addition, FIG. 1 is merely an example and the technology of the present application may be applied to a video coding application that does not necessarily include any data communication between an encoding apparatus and a decoding apparatus (for example, one-sided video encoding or video decoding). In another example, a local memory is searched for data, the data is transmitted by means of streaming transmission in a network, or the data is operated in a similar manner. The encoding apparatus may encode data and store the data in a memory, and/or the decoding apparatus may search the memory for the data and decode the data. In many examples, encoding and decoding are performed by multiple apparatuses that do not communicate with each other and only encode data into a memory and/or search the memory for the data and decode the data.

The video encoder 20 and the video decoder 30 may be separately implemented as any possible implementation, for example, one or more microprocessors, a digital signal processor (DSP), an application-specific integrated circuit (ASIC), a field programmable gate array (FPGA), discrete logic, hardware, or any combination thereof, in multiple suitable circuits. If the technology is partially or completely implemented using software, the apparatus may store an instruction of the software in a suitable non-transitory computer readable storage medium, and may use one or more processors to execute an instruction in hardware in order to perform the technology of the present application. Any one (including hardware, software, a combination of hardware and software, and the like) of the foregoing may be considered as the one or more processors. Each of the video encoder 20 and the video decoder 30 may be included in one or more encoders or decoders. Any one of the video encoder 20 or the video decoder 30 may be integrated as a part of a combined encoder/decoder (CODEC) in another apparatus.

The present application may mean, in general, that information is "transmitted using a signal" by the video encoder 20 to another apparatus (for example, the video decoder 30). The term "transmitted using a signal" may refer to, in general, a syntactic element and/or indicate conveyance of encoded video data. The conveyance may occur in real time or approximately in real time. Alternatively, such communication may occur in a time span, for example, may occur when a syntactic element is stored in a computer readable storage medium using binary data obtained by means of encoding during encoding. After being stored in the medium, the syntactic element may be searched for by the decoding apparatus at any time.

The video encoder 20 encodes video data. The video data may include one or more pictures. The video encoder 20 may generate a bitstream. The bitstream includes, in a form of a bit stream, encoding information of the video data. The encoding information may include encoded picture data and associated data. The associated data may include an SPS, a PPS, and another syntactic structure. The SPS may include a parameter applied to zero or multiple sequences. The PPS may include a parameter applied to zero or multiple pictures. The syntactic structure refers to a set of zero or multiple syntactic elements arranged in the bitstream in a specified sequence.

To generate encoding information of a picture, the video encoder 20 may partition the picture into rasters of code tree blocks (CTBs). In some examples, the CTB may be referred to as a "tree block," a "largest code unit" (LCU), or a "coding tree unit." The CTB is not limited to a particular size and may include one or more code units (CUs). Each CTB may be associated with a pixel block that is in the picture and that has an equal size. Each pixel may correspond to a luminance (or luma) sample and two chrominance (or chroma) samples. Therefore, each CTB may be associated with one luminance sample block and two chrominance sample blocks. The CTBs of the picture may be divided into one or more slices. In some examples, each slice includes an integral quantity of CTBs. As a part of picture encoding, the video encoder 20 may generate encoding information of each slice of the picture, that is, encode a CTB in the slice. To encode the CTB, the video encoder 20 may recursively perform quadtree partitioning on a pixel block associated with the CTB in order to partition the pixel block into descending pixel blocks. The relatively small pixel block may be associated with a CU.

The video encoder 20 may generate one or more prediction units (PUs) of each CU that is no longer partitioned. PUs of the CU may be associated with different pixel blocks in a pixel block of the CU. The video encoder 20 may generate a predictive pixel block for each PU of the CU. The video encoder 20 may generate the predictive pixel block of the PU by means of intra-frame prediction or inter-frame prediction. If the video encoder 20 generates the predictive pixel block of the PU by means of intra-frame prediction, the video encoder 20 may generate, based on a decoded pixel of a picture associated with the PU, the predictive pixel block of the PU. If the video encoder 20 generates the predictive pixel block of the PU by means of inter-frame prediction, the video encoder 20 may generate, based on a decoded pixel of one or more pictures different from a picture associated with the PU, the predictive pixel block of the PU. The video encoder 20 may generate, based on the predictive pixel block of the PU of the CU, a residual pixel block of the CU. The residual pixel block of the CU may indicate a difference between a sample value in the predictive pixel block of the PU of the CU and a corresponding sample value in an initial pixel block of the CU.

The video encoder 20 may perform recursive quadtree partitioning on the residual pixel block of the CU to partition the residual pixel block of the CU into one or more smaller residual pixel blocks associated with a transform unit (TU) of the CU. Pixels in a pixel block associated with the TU separately correspond to one luminance sample and two chrominance samples. Therefore, each TU may be associated with one luminance residual sample block and two chrominance residual sample blocks. The video encoder 20 may apply one or more transforms to a residual sample block associated with the TU to generate a coefficient block (that is, a block of a coefficient). The transform may be a DCT transform or a variant of the DCT transform. A two-dimensional transform is calculated using a DCT transform matrix and by applying a one-dimensional transform in horizontal and vertical directions to obtain the coefficient block. The video encoder 20 may perform a quantization procedure on each coefficient in the coefficient block. Quantization usually refers to a process in which a coefficient is quantized to reduce a data volume used to indicate the coefficient in order to provide further compression.

The video encoder 20 may generate a set of syntactic elements indicating the coefficient in the coefficient block after the quantization. The video encoder 20 may apply an entropy encoding operation (for example, a context-adaptive binary arithmetic coding (CABAC) operation) to some or all of the foregoing syntactic elements. To apply CABAC encoding to the syntactic element, the video encoder 20 may binarize the syntactic element to form a binary sequence including one or more bits (which are referred to as "binary bits"). The video encoder 20 may encode some of the binary bits by means of regular encoding, and may encode remaining binary bits by means of bypass encoding.

In addition to performing entropy encoding on the syntactic element of the coefficient block, the video encoder 20 may apply inverse quantization and an inverse transform to a transformed coefficient block in order to reconstruct the residual sample block using the transformed coefficient block. The video encoder 20 may add the reconstructed residual sample block to a sample block corresponding to one or more predictive sample blocks, to generate a reconstructed sample block. By reconstructing a sample block of each color component, the video encoder 20 may reconstruct the pixel block associated with the TU. A pixel block of each TU of the CU is reconstructed in such a manner until an entire pixel block of the CU is reconstructed.

After reconstructing the pixel block of the CU, the video encoder 20 may perform a deblocking filtering operation to reduce a blocking effect of the pixel block associated with the CU. After performing the deblocking filtering operation, the video encoder 20 may use a sample adaptive offset (SAO) to modify a reconstructed pixel block of the CTB of the picture. After performing such operations, the video encoder 20 may store the reconstructed pixel block of the CU in a decoded picture buffer for generating a predictive pixel block of another CU.

The video decoder 30 may receive the bitstream. The bitstream includes, in the form of a bit stream, the encoding information of the video data encoded by the video encoder 20. The video decoder 30 may parse the bitstream so as to extract the syntactic element from the bitstream. When performing CABAC decoding, the video decoder 30 may perform regular decoding on some binary bits and may perform bypass decoding on remaining binary bits. Binary bits in the bitstream have a mapping relationship with the syntactic element, and the syntactic element is obtained by parsing the binary bits.

The video decoder 30 may reconstruct, based on the syntactic element extracted from the bitstream, the picture of the video data. A process of reconstructing, based on the syntactic element, the video data is inverse, in general, to a process performed by the video encoder 20 to generate the syntactic element. For example, the video decoder 30 may generate, based on a syntactic element associated with a CU, a predictive pixel block of a PU of the CU. In addition, the video decoder 30 may perform inverse quantization on a coefficient block associated with a TU of the CU. The video decoder 30 may perform an inverse transform on the coefficient on which the inverse quantization has been performed, to reconstruct a residual pixel block associated with the TU of the CU. The video decoder 30 may reconstruct, based on the predictive pixel block and the residual pixel block, a pixel block of the CU.

After reconstructing the pixel block of the CU, the video decoder 30 may perform a deblocking filtering operation, to reduce a blocking effect of the pixel block associated with the CU. In addition, the video decoder 30 may perform, based on one or more SAO syntactic elements, a same SAO operation as that of the video encoder 20. After performing such operations, the video decoder 30 may store the pixel block of the CU in the decoded picture buffer. The decoded picture buffer may provide a reference picture used for subsequent motion compensation, intra-frame prediction, and presentation by the display apparatus.

Figure 2:
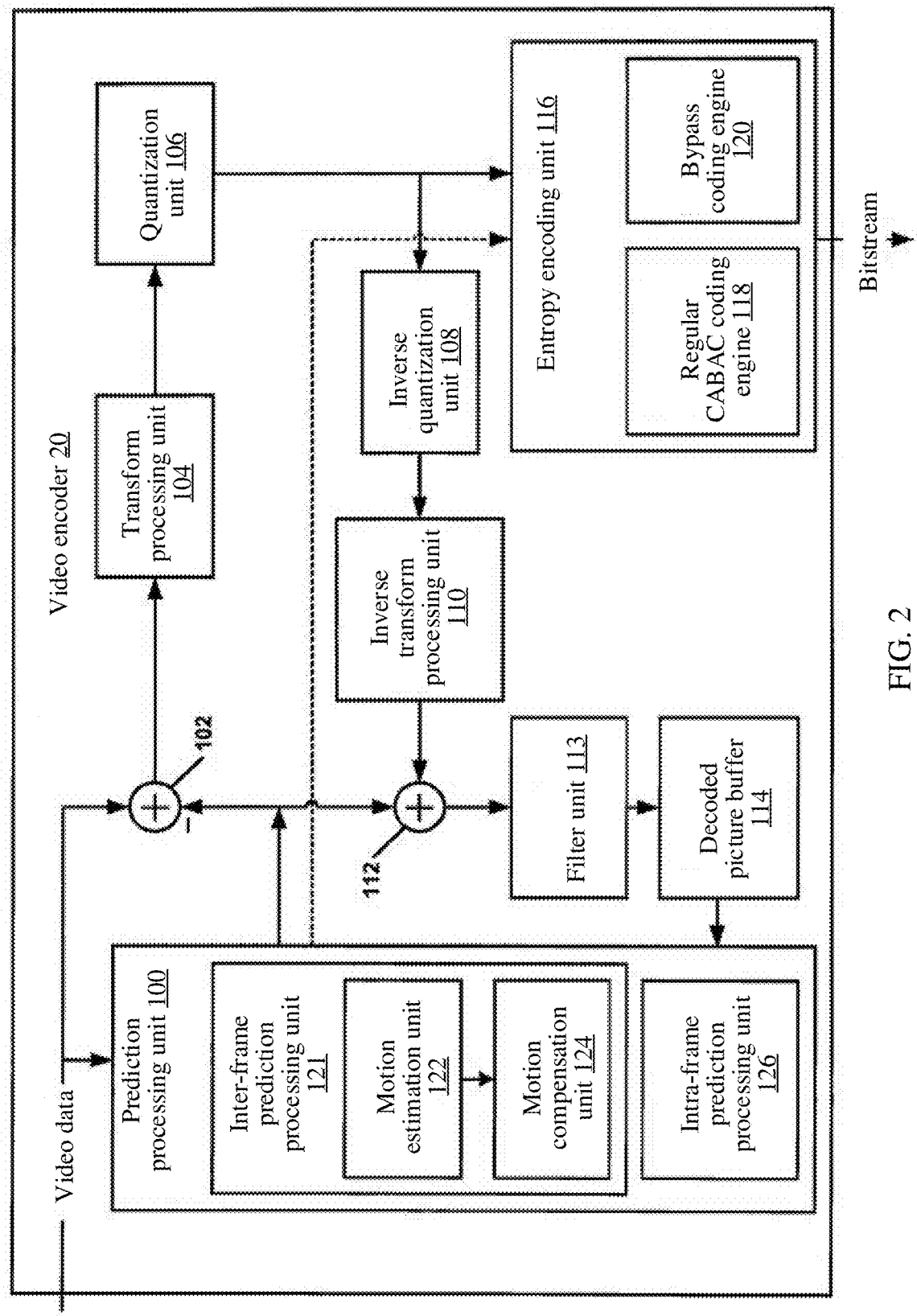
FIG. 2 is a schematic block diagram of a video encoder according to an embodiment of the present application.

FIG. 2 is a block diagram illustrating an example of a video encoder 20 configured to implement a technology of the present application. It should be understood that FIG. 2 is an example and should not be considered as a limitation to a technology such as the technology that is widely exemplified and described in the present application. As shown in FIG. 2, the video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. The entropy encoding unit 116 includes a regular CABAC coding engine 118 and a bypass coding engine 120. The prediction processing unit 100 includes an inter-frame prediction processing unit 121 and an intra-frame prediction processing unit 126. The inter-frame prediction processing unit 121 includes a motion estimation unit 122 and a motion compensation unit 124. In another example, the video encoder 20 may include more, fewer, or different functional components.

The video encoder 20 receives video data. To encode the video data, the video encoder 20 may encode each slice of each picture of the video data. As a part of slice encoding, the video encoder 20 may encode each CTB in the slice. As a part of CTB encoding, the prediction processing unit 100 may perform quadtree partitioning on a pixel block associated with the CTB in order to partition the pixel block into descending pixel blocks. For example, the prediction processing unit 100 may partition the pixel block of the CTB into four sub-blocks having an equal size, partition one or more of the sub-blocks into four sub-sub-blocks having an equal size, and the like.

The video encoder 20 may encode a CU of a CTB in a picture to generate encoding information of the CU. The video encoder 20 may encode CUs of the CTB in a zigzag scanning sequence. That is, the video encoder 20 may encode the CUs in a sequence of an upper left CU, an upper right CU, a lower left CU, and then a lower right CU. When encoding a partitioned CU, the video encoder 20 may encode, in the zigzag scanning sequence, CUs associated with sub-blocks of a pixel block of the partitioned CU.

In addition, the prediction processing unit 100 may partition a pixel block of the CU in one or more PUs of the CU. The video encoder 20 and the video decoder 30 may support various PU sizes. Assuming that a particular CU has a size of 2N*2N, the video encoder 20 and the video decoder 30 may support a PU size of 2N*2N or N*N for intra-frame prediction, and support a symmetric PU having a size of 2N*2N, 2N*N, N*2N, N*N, or a similar size for inter-frame prediction. The video encoder 20 and the video decoder 30 may further support an asymmetric PU having a size of 2N*nU, 2N*nD, nL*2N, or nR*2N for inter-frame prediction.

The inter-frame prediction processing unit 121 may perform inter-frame prediction on each PU of the CU to generate prediction data of the PU. The prediction data of the PU may include a predictive pixel block corresponding to the PU and motion information of the PU. The slice may be a slice I, a slice P, or a slice B. The inter-frame prediction processing unit 121 may perform different operations on the PU of the CU according to whether the PU is in the slice I, the slice P, or the slice B. In the slice I, intra-frame prediction is performed on all PUs.

If the PU is in the slice P, the motion estimation unit 122 may search a reference picture in a reference picture list (for example, a "list 0") for a reference block of the PU. The reference block of the PU may be a pixel block that most closely corresponds to a pixel block of the PU. The motion estimation unit 122 may generate a reference picture index indicating a reference picture that is in the list 0 and that includes the reference block of the PU and a motion vector indicating a spatial displacement between the pixel block of the PU and the reference block. The motion estimation unit 122 may use the reference picture index and the motion vector as motion information of the PU for output. The motion compensation unit 124 may generate, based on the reference block indicated by the motion information of the PU, a predictive pixel block of the PU.

If the PU is in the slice B, the motion estimation unit 122 may perform unidirectional inter-frame prediction or bidirectional inter-frame prediction on the PU. To perform the unidirectional inter-frame prediction on the PU, the motion estimation unit 122 may search a reference picture in a first reference picture list (a "list 0") or a second reference picture list (a "list 1") for a reference block of the PU. The motion estimation unit 122 may use the following as motion information of the PU for output a reference picture index indicating a location in the list 0 or list 1 that includes the reference picture of the reference block, a motion vector indicating a spatial displacement between a pixel block of the PU and the reference block, and a predictive direction indicator indicating whether the reference picture is in the list 0 or the list 1. To perform the bidirectional inter-frame prediction on the PU, the motion estimation unit 122 may search a reference picture in the list 0 for a reference block of the PU, and may further search a reference picture in the list 1 for another reference block of the PU. The motion estimation unit 122 may generate reference picture indexes indicating locations in the list 0 and the list 1 that include the reference picture of the reference block. In addition, the motion estimation unit 122 may generate a motion vector indicating a spatial displacement between the reference block and a pixel block of the PU. The motion information of the PU may include the reference picture index and the motion vector of the PU. The motion compensation unit 124 may generate, based on the reference block indicated by the motion information of the PU, a predictive pixel block of the PU.

The intra-frame prediction processing unit 126 may perform intra-frame prediction on the PU to generate prediction data of the PU. The prediction data of the PU may include a predictive pixel block of the PU and various syntactic elements. The intra-frame prediction processing unit 126 may perform intra-frame prediction on PUs in the slice I, the slice P, and the slice B.

To perform the intra-frame prediction on the PU, the intra-frame prediction processing unit 126 may generate multiple sets of prediction data of the PU using multiple intra-frame prediction modes. To generate the set of the prediction data of the PU using the intra-frame prediction modes, the intra-frame prediction processing unit 126 may expand a sample from a sample block of a neighboring PU across a sample block of the PU in a direction associated with the intra-frame prediction modes. Assuming that a left-to-right and upper-to-lower encoding sequence is used for the PU, the CU, and the CTB, the neighboring PU may be above the PU, on the upper right of the PU, on the upper left of the PU, or on the left of the PU. The intra-frame prediction processing unit 126 may use different quantities of intra-frame prediction modes, for example, 33 directional intra-frame prediction modes. In some examples, a quantity of intra-frame prediction modes may depend on a size of the pixel block of the PU.

The prediction processing unit 100 may select prediction data of the PU of the CU from the prediction data generated by the inter-frame prediction processing unit 121 for the PU or the prediction data generated by the intra-frame prediction processing unit 126 for the PU. In some examples, the prediction processing unit 100 selects, based on rate/distortion measurement of the set of the prediction data, the prediction data of the PU of the CU. For example, a Lagrangian cost function is used to select between an encoding mode and a parameter value (for example, a motion vector, a reference index, and an intra-frame prediction direction) of the encoding mode. In such type of cost function, a weighting factor lambda is used to connect an actual or estimated picture distortion caused by a lossy encoding method to an actual or estimated amount of information needed for indicating a pixel value in a picture region C=D+lambda*R, where C is a to-be-minimized Lagrangian cost, D is a picture distortion (for example, a mean square error) having a mode and a parameter of the mode, and R is a quantity of bits (for example, including a data volume used to indicate a candidate motion vector) that is needed for picture block reconstruction in a decoder. Usually, an encoding mode having a lowest cost is selected as an actual encoding mode. Selecting a predictive pixel block of prediction data may be referred to as selecting a predictive pixel block in this specification.

The residual generation unit 102 may generate, based on the pixel block of the CU and a selected predictive pixel block of the PU of the CU, a residual pixel block of the CU. For example, the residual generation unit 102 may generate the residual pixel block of the CU such that each sample in the residual pixel block has a value equal to a difference between the following two a sample in the pixel block of the CU, and a corresponding sample in the selected predictive pixel block of the PU of the CU.

The prediction processing unit 100 may perform quadtree partitioning to partition the residual pixel block of the CU into sub-blocks. Each residual pixel block that is no longer divided may be associated with different TUs of the CU. There is no necessary connection between a size and a location of a residual pixel block associated with a TU of the CU and a size and a location of the pixel block based on the PU of the CU.

A pixel of the residual pixel block of the TU may correspond to one luminance sample and two chrominance samples. Therefore, each TU may be associated with one luminance sample block and two chrominance sample blocks. The transform processing unit 104 may apply one or more transforms to a residual sample block associated with the TU to generate a coefficient block of each TU of the CU. For example, the transform processing unit 104 may apply a DCT, a directional transform, or a transform having a similar concept to the residual sample block.

The quantization unit 106 may quantize a coefficient in the coefficient block. For example, an n-bit coefficient may be truncated to an m-bit coefficient during quantization, where n is greater than m. The quantization unit 106 may quantize, based on a quantization parameter (QP) value associated with the CU, the coefficient block associated with the TU of the CU. The video encoder 20 may adjust, by adjusting the QP value associated with the CU, a quantization degree applied to the coefficient block associated with the CU.

The inverse quantization unit 108 and the inverse transform processing unit 110 may respectively apply inverse quantization and an inverse transform to a transformed coefficient block in order to reconstruct the residual sample block using the coefficient block. The reconstruction unit 112 may add a sample of the reconstructed residual sample block to a sample corresponding to one or more predictive sample blocks generated by the prediction processing unit 100 in order to generate a reconstructed sample block associated with the TU. The video encoder 20 may reconstruct the pixel block of the CU by reconstructing a sample block of each TU of the CU in such a manner.

The filter unit 113 may perform a deblocking filtering operation in order to reduce a blocking effect of the pixel block associated with the CU. In addition, the filter unit 113 may apply an SAO offset determined by the prediction processing unit 100 to the reconstructed sample block to recover the pixel block. The filter unit 113 may generate encoding information of an SAO syntactic element of the CTB.

The decoded picture buffer 114 may store the reconstructed pixel block. The inter-frame prediction processing unit 121 may perform inter-frame prediction on a PU of another picture using a reference picture including the reconstructed pixel block. In addition, the intra-frame prediction processing unit 126 may perform, using the reconstructed pixel block in the decoded picture buffer 114, intra-frame prediction on another PU in a same picture as that of the CU.

The entropy encoding unit 116 may receive data from another functional component of the video encoder 20. For example, the entropy encoding unit 116 may receive the coefficient block from the quantization unit 106 and may receive the syntactic element from the prediction processing unit 100. The entropy encoding unit 116 may perform one or more entropy encoding operations on the data to generate data on which entropy encoding has been performed. For example, the entropy encoding unit 116 may perform a context-adaptive variable-length coding (CAVLC) operation, a CABAC operation, a variable to variable (V2V) length coding operation, a syntax-based CABAC (SBAC) operation, a probability interval partitioning entropy (PIPE) coding operation, or an entropy encoding operation of another type on the data. In a particular example, the entropy encoding unit 116 may encode, using the regular CABAC coding engine 118, a binary bit on which regular CABAC coding has been performed and that is of the syntactic element, and may encode, using the bypass coding engine 120, a binary bit on which bypass coding has been performed.

Figure 3:
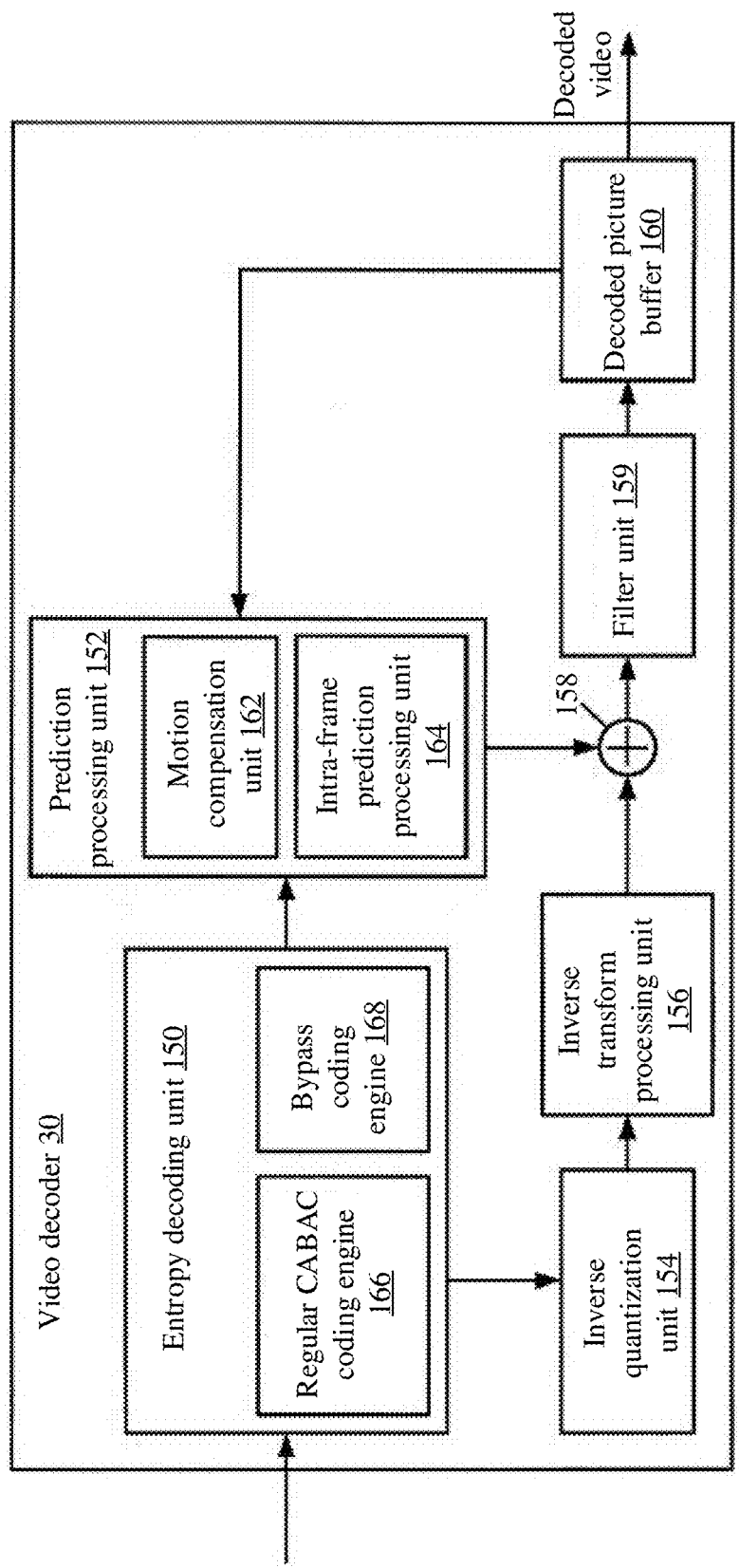
FIG. 3 is a schematic block diagram of a video decoder according to an embodiment of the present application.

FIG. 3 is a block diagram illustrating an example of a video decoder 30 configured to implement a technology of the present application. It should be understood that FIG. 3 is an example and should not be considered as a limitation to a technology such as the technology that is widely exemplified and described in the present application. As shown in FIG. 3, the video decoder 30 includes an entropy decoding unit 150, a prediction processing unit 152, an inverse quantization unit 154, an inverse transform processing unit 156, a reconstruction unit 158, a filter unit 159, and a decoded picture buffer 160. The prediction processing unit 152 includes a motion compensation unit 162 and an intra-frame prediction processing unit 164. The entropy decoding unit 150 includes a regular CABAC coding engine 166 and a bypass coding engine 168. In another example, the video decoder 30 may include more, fewer, or different functional components.

The video decoder 30 may receive a bitstream. The entropy decoding unit 150 may parse the bitstream so as to extract a syntactic element from the bitstream. As a part of bitstream parsing, the entropy decoding unit 150 may parse the bitstream to obtain a syntactic element on which entropy encoding has been performed. The prediction processing unit 152, the inverse quantization unit 154, the inverse transform processing unit 156, the reconstruction unit 158, and the filter unit 159 may decode video data according to the syntactic element extracted from the bitstream, that is, generate decoded video data.

The syntactic element may include a binary bit on which regular CABAC coding has been performed and a binary bit on which bypass coding has been performed. The entropy decoding unit 150 may decode, using the regular CABAC coding engine 166, the binary bit on which the regular CABAC coding has been performed, and may decode, using the bypass coding engine 168, the binary bit on which the bypass coding has been performed.

In addition, the video decoder 30 may perform a reconstruction operation on a CU that is no longer partitioned. To perform the reconstruction operation on the CU that is no longer partitioned, the video decoder 30 may perform a reconstruction operation on each TU of the CU. The video decoder 30 may reconstruct a residual pixel block associated with the CU by performing the reconstruction operation on each TU of the CU.

As a part of performing the reconstruction operation on the TU of the CU, the inverse quantization unit 154 may perform inverse quantization (that is, dequantization) on a coefficient block associated with the TU. The inverse quantization unit 154 may determine a quantization degree using a QP value associated with the CU of the TU. This is the same as determining an inverse quantization degree to be applied by the inverse quantization unit 154.

After the inverse quantization unit 154 performs the inverse quantization on the coefficient block, the inverse transform processing unit 156 may apply one or more inverse transforms to the coefficient block in order to generate a residual sample block associated with the TU. For example, the inverse transform processing unit 156 may apply, to the coefficient block, an inverse DCT, an inverse integer transform, an inverse K-L transform, an inverse rotation transform, an inverse directional transform, or another inverse transform corresponding to a transform on an encoder side.

If intra-frame prediction encoding is used for the PU, the intra-frame prediction processing unit 164 may perform intra-frame prediction to generate a predictive sample block of the PU. The intra-frame prediction processing unit 164 may generate, based on a pixel block of a neighboring PU in a space, a predictive pixel block of the PU using an intra-frame prediction mode. The intra-frame prediction processing unit 164 may determine the intra-frame prediction mode of the PU according to one or more syntactic elements obtained by parsing the bitstream.

The motion compensation unit 162 may construct a first reference picture list (a list 0) and a second reference picture list (a list 1) according to the syntactic element obtained by parsing the bitstream. In addition, if inter-frame prediction encoding is used for the PU, the entropy decoding unit 150 may parse motion information of the PU. The motion compensation unit 162 may determine one or more reference blocks of the PU according to the motion information of the PU. The motion compensation unit 162 may generate the predictive pixel block of the PU according to the one or more reference blocks of the PU.

When being applicable, the reconstruction unit 158 may use a residual pixel block associated with the TU of the CU and the predictive pixel block (that is, intra-frame prediction data or inter-frame prediction data) of the PU of the CU in order to reconstruct a pixel block of the CU. Particularly, the reconstruction unit 158 may add a sample of the residual pixel block to a sample corresponding to the predictive pixel block in order to reconstruct the pixel block of the CU.

The filter unit 159 may perform a deblocking filtering operation in order to reduce a blocking effect of the pixel block associated with the CU of the CTB. In addition, the filter unit 159 may modify a pixel value of the CTB according to an SAO syntactic element obtained by parsing the bitstream. For example, the filter unit 159 may determine a correction value according to the SAO syntactic element of the CTB, and add the determined correction value to a sample value in a reconstructed pixel block of the CTB. The filter unit 159 may correct, by modifying some or all pixel values of the CTB of a picture, a reconstructed picture of the video data according to the SAO syntactic element.

The video decoder 30 may store the pixel block of the CU in the decoded picture buffer 160. The decoded picture buffer 160 may provide a reference picture for subsequent motion compensation, intra-frame prediction, and presentation by a display apparatus (for example, the display apparatus 32 in FIG. 1). For example, the video decoder 30 may perform an intra-frame prediction operation or an inter-frame prediction operation on a PU of another CU according to the pixel block in the decoded picture buffer 160.

This embodiment of the present application discloses a reference frame decoding method. Referring to FIG. 3, it may be learned that the motion compensation unit 162 may construct a first reference frame list and a second reference frame list according to a syntactic element obtained by parsing a bitstream. If inter-frame prediction encoding is used for a PU, the entropy decoding unit 150 may parse motion information of the PU. The motion compensation unit 162 may determine one or more reference blocks of the PU according to the motion information of the PU. The motion compensation unit 162 may generate a predictive pixel block of the PU according to the one or more reference blocks of the PU.

Figure 4:
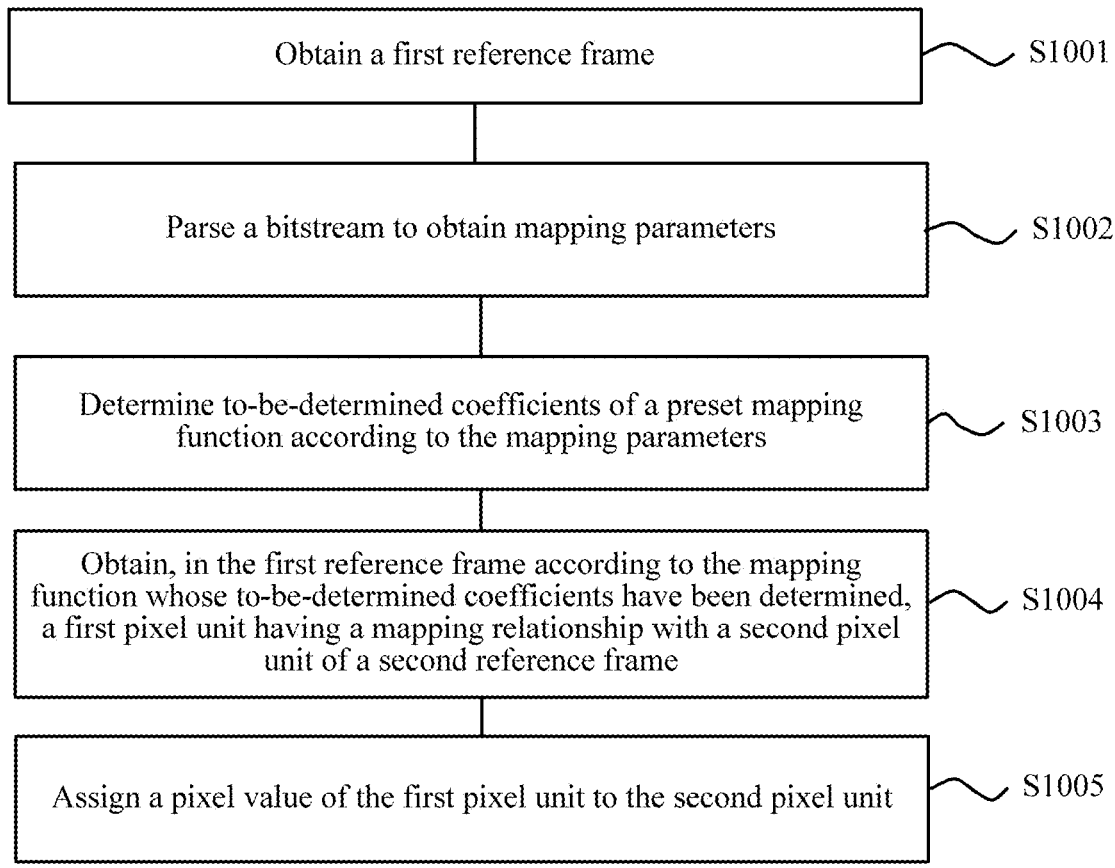
FIG. 4 is a schematic flowchart of a reference frame decoding method according to an embodiment of the present application.

FIG. 4 is a schematic flowchart of a reference frame decoding method 1000 according to an embodiment of the present application. As shown in FIG. 4, the method 1000 includes the following steps.

Step S1001: Obtain a first reference frame.

The first reference frame may be a current picture frame on which decoding reconstruction has been performed. A to-be-obtained second reference frame needs to be obtained with reference to the first reference frame. Therefore, optionally, to improve accuracy of the second reference frame, pixel interpolation processing may be performed on the current picture frame on which decoding reconstruction has been performed to obtain a picture on which pixel interpolation has been performed as the first reference frame. There are many implementations of performing pixel interpolation on a picture. In a feasible implementation, a manner of single-frame picture pixel interpolation is used, that is, interpolation filtering is performed on a pixel unit of a current picture, where the pixel unit may be referred to as an entire pixel unit, in a location of a partial pixel unit of the current picture, a pixel value of the partial pixel unit is obtained by means of derivation. All of the entire pixel unit and the partial pixel unit jointly form an interpolated picture of the current picture. The document Researches on Optimal Interpolation Algorithm for Digital Pictures (Chinese Space Science and Technology Issue 03, 2005) is quoted herein in its entirety and describes an existing picture interpolation algorithm. It may be understood that methods described in the document may all be examples. An optional implementation of obtaining the first reference frame in step S1001 in this embodiment is not limited.

Step S1002: Parse a bitstream to obtain mapping parameters.

In a feasible implementation: A preset mapping function is set as $x'=m_0x+m_1y+m_2$, $y'=m_3x+m_4y+m_5$, x, y are a horizontal coordinate and a vertical coordinate of a source pixel unit, x', y' are a horizontal coordinate and a vertical coordinate of a target pixel unit having a mapping relationship with the source pixel unit x, y, and $m_0,m_1,m_2,m_3,m_4,m_5$ are to-be-determined coefficients. Then, the entropy decoding unit 150 in FIG. 3 obtains specific values of six mapping parameters by parsing the bitstream in a corresponding location. The six mapping parameters correspond to the to-be-determined coefficients $m_0,m_1,m_2,m_3,m_4,m_5$ of the preset mapping function.

It should be understood that the preset mapping function is obtained according to empirical or experimental data and is solidified in a codec in a same form (in some embodiments, the mapping function may further be synchronously updated in the codec), that is, an encoder does not need to send any indication information to a decoder, and the decoder may learn the mapping function and use the mapping function using a same operation as that of the encoder.

It should be understood that the mapping function in the foregoing implementation is an example. Natural motions have diversity. Therefore, there are multiple mapping functions, for example, a four-parameter mapping function or an eight-parameter mapping function, for matching different motion models. This is not limited.

It should be understood that the mapping parameters in step S1002 need to be kept consistent with the to-be-determined coefficients in the preset mapping function, that is, the mapping parameters have a same quantity and same physical meanings as those of the to-be-determined coefficients.

It should be understood that such mapping parameters are transferred at a frame level, may be transferred in a PPS, may be transferred in a slice header, or may be transferred as another frame-level syntactic element. This is not limited.

Step S1003: Determine to-be-determined coefficients of a preset mapping function according to the mapping parameters.

That is, specific mapping parameters obtained by means of parsing in step S1002 is substituted into a mapping function according to a one-to-one correspondence between the specific mapping parameters and the to-be-determined coefficients of the preset mapping function in order to obtain a mapping function $x'=m_0x+m_1y+m_2$, $y'=m_3x+m_4y+m_5$ whose independent variable is a coordinate location of a source pixel and whose dependent variable is a coordinate location of a target pixel, where x, y are a horizontal coordinate and a vertical coordinate of a source pixel unit, x', y' are a horizontal coordinate and a vertical coordinate of a target pixel unit having the mapping relationship with the source pixel unit x, y, and $m_0,m_1,m_2,m_3,m_4,m_5$ are the mapping parameters.

Step S1004: Obtain, in the first reference frame according to the mapping function whose to-be-determined coefficients have been determined, a first pixel unit having a mapping relationship with a second pixel unit of a second reference frame.

That is, for each pixel unit in the second reference frame, there is a unique pixel unit that is in the first reference frame and that is mapped to the pixel unit, and a location of a mapped pixel unit in the first reference frame may be obtained using the mapping function in step S1004. Further, in the first reference frame, a location of the first pixel unit is $x'=m_0x+m_1y+m_2$, $y'=m_3x+m_4y+m_5$, where x, y are a horizontal coordinate and a vertical coordinate of the second pixel unit, x', y' are a horizontal coordinate and a vertical coordinate of the first pixel unit having the mapping relationship with the second pixel unit.

Step S1005: Assign a pixel value of the first pixel unit to the second pixel unit.

For each pixel unit in the second reference frame, there is a pixel unit that is in the first reference frame and that is in a one-to-one correspondence with the pixel unit, and a location of the pixel unit in the first reference frame may be obtained using step S1004. Therefore, a pixel value of the pixel unit in the location is assigned to the corresponding pixel unit in the second reference frame. When all pixel units in the second reference frame obtain an assigned value, the second reference frame is constructed.

It should be understood that there is no sequential connection between obtaining of the first reference frame in step S1001 and obtaining of the mapping function in steps S1002 and S1003, and a sequence may be adjusted, provided that obtaining of the mapping parameters in S1002 corresponds to a step of encoding the mapping parameters on an encoder side.

A reference frame needs to be put into a reference frame list in order to become a candidate reference frame of a to-be-decoded picture frame. Prediction accuracy can be improved only when the reference frame is closer to actual picture content.

A multi-frame reference technology is used in all of H.263, H.264/AVC, and HEVC in order to improve accuracy of inter-frame prediction. A picture on which decoding has been performed is buffered in a decoded and reconstructed picture buffer (DPB) to be used as a reference picture for subsequent frames. Therefore, a picture in the DPB needs to be managed using a standard. Each picture in the DPB has three states, "Not used as a reference," "Used as a short-term reference frame," and "Used as a long-term reference frame." Switching between the three states is controlled using a decoded picture tagging process. Two manners, that is, a sliding window and a memory management control operation (MMCO), are used in the H.264/AVC. In a sliding window management manner, as the name implies, a quantity of frames that can be stored in the DPB is used as a window, and a newly decoded picture is moved in and a decoded picture exceeding the window is moved out in a first in first out manner during a decoding operation on a currently decoded picture. Therefore, the DPB stores multiple pictures that are recently decoded. For the MMCO, a control command is transmitted in a bitstream in order to complete state tagging of a picture in the DPB. A frame with "Used as a short-term reference frame" or "Used as a long-term reference frame" may be tagged as "Not used as a reference" using the MMCO. Alternatively, a current frame or a frame "Used as a short-term reference frame" may be tagged as a frame "Used as a long-term reference frame" using the MMCO, and so on.

Figure 5:
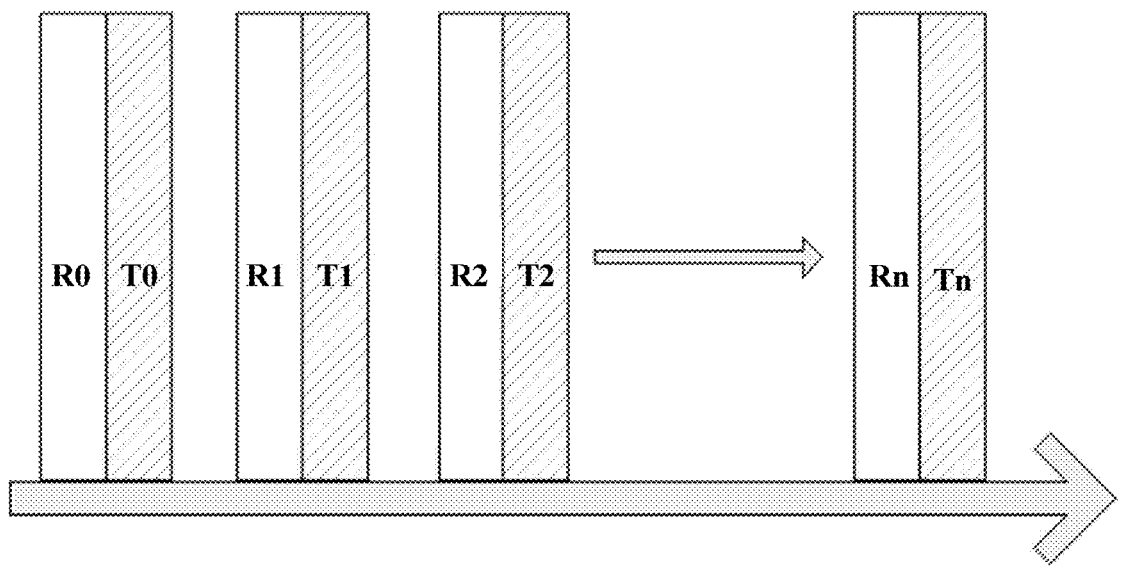
FIG. 5 is a schematic diagram of interleaved arrangement of original reference frames and transform reference frames in a reference frame list.

In a feasible implementation 1, the second reference frame generated in step S1005 and a picture frame on which decoding reconstruction has been performed are both added to a reference frame list. In addition, according to the sliding window management manner, when a newly decoded picture is moved in, a decoded picture exceeding the window is moved out in a first in first out manner. Particularly, the second reference frame and the picture frame on which decoding reconstruction has been performed are in neighboring locations in the reference frame list. Particularly, in the reference frame list, a reference frame generated using the decoding method 1000 may be arranged, in an interleaved manner, with the picture frame on which decoding reconstruction has been performed. As shown in FIG. 5, Rn indicates the picture frame on which decoding reconstruction has been performed, where n=0, 1, 2, . . . , and Tn indicates the reference frame generated using the decoding method 1000, where n=0, 1, 2, . . . .

For example, the implementation 1 may be implemented by the following modules an obtaining module configured to obtain a reference frame list, where the reference frame list includes a candidate reference frame of a first picture frame on which the decoding reconstruction has been performed, and a construction module configured to add the first picture frame on which decoding reconstruction has been performed and the second reference frame to the reference frame list, where a location of the first picture frame on which decoding reconstruction has been performed is adjacent to a location of the second reference frame in the reference frame list.

In a feasible implementation 2, only the second reference frame generated in step S1005 is added to a reference frame list. Similarly, a decoded picture exceeding the window is moved out.

For example, the implementation 2 may be implemented by the following modules an obtaining module configured to obtain a reference frame list, where the reference frame list includes a candidate reference frame of a first picture frame on which decoding reconstruction has been performed, and a construction module configured to add the second reference frame to the reference frame list.

In a feasible implementation 3, multiple reference frames generated in step S1005 are constructed based on multiple picture frames on which decoding reconstruction has been performed and according to the decoding method 1000. In an embodiment, it may be assumed that two reference frames, that is, the second reference frame and a fourth reference frame, that are generated in step S1005 are constructed based on two picture frames, that is, the first reference frame and a third reference frame, on which decoding reconstruction has been performed and according to the decoding method 1000. The first reference frame is generated before the third reference frame, and the second reference frame and the fourth reference frame are constructed using a same preset mapping function and same mapping parameters. Usually, the mapping parameters need to be obtained by means of parsing only once. The second reference frame and the fourth reference frame are weighted to obtain a fifth reference frame. A weighted value may be set according to indicators such as different picture quality, different predictive accuracy, and different similarities with an actual sequence between the second reference frame and the fourth reference frame or between the first reference frame and the third reference frame. This is not limited. For example, an average value of pixel units corresponding to the second reference frame and the fourth reference frame may be calculated. The picture frame on which decoding reconstruction has been performed or the fifth reference frame is added to the reference frame list. Alternatively, the picture frame on which decoding reconstruction has been performed and the fifth reference frame may be both added to the reference frame list. Similarly, a decoded picture exceeding the window is moved out.

For example, the implementation 3 may be implemented by the following modules a first obtaining module configured to obtain a third reference frame, where the third reference frame is a second picture frame on which decoding reconstruction has been performed or a second interpolated picture frame obtained by means of pixel interpolation on the second picture frame, a second obtaining module configured to obtain, in the third reference frame according to the mapping function whose to-be-determined coefficients have been determined, a third pixel unit having the mapping relationship with a fourth pixel unit of a fourth reference frame, an assignment module configured to assign a pixel value of the third pixel unit to the fourth pixel unit, a third obtaining module configured to obtain a reference frame list, where the reference frame list includes a candidate reference frame of the second picture frame on which decoding reconstruction has been performed, a calculation module configured to perform weighted addition on a pixel unit of the second reference frame and a pixel unit in a same location in the fourth reference frame, to obtain a fifth reference frame, and a construction module configured to add the second picture frame on which decoding reconstruction has been performed or the fifth reference frame to the reference frame list.

In a feasible implementation 4, a region in the first reference frame is arbitrarily selected. For example, the entire first reference frame may be selected, and then the region is a matrix whose vertexes are four vertexes of the first reference frame. Alternatively, a region of any shape may be arbitrarily obtained in the first reference frame. This is not limited. A region covered by the entire first reference frame may be referred to as a first region. Locations of four scatters that are in the second reference frame and that correspond to the four vertexes of the first region are calculated according to an inverse function of the mapping function in step S1003. The four scatters are connected according to a connection relationship of the four vertexes of the first region in order to encircle a region in the second reference frame. The encircled region may be set as a second region. In a coordinate plane location relationship, an overlapped part and a non-overlapped part exist in coverage of the first region and the second region. The overlapped part is referred to as an intersection of the first region and the second region. The non-overlapped part in the coverage of the first region and the second region and the intersection are referred to as a union of the first region and the second region. A ratio of an area of the intersection to an area of the union is calculated. When the ratio is less than a preset value, the second reference frame is added to a reference frame list, otherwise, the picture frame on which decoding reconstruction has been performed is added to the reference frame list. It should be understood that an objective of the solution is to determine a difference between the picture frame on which decoding reconstruction has been performed and the second reference frame. When the difference is relatively small, the picture frame on which decoding reconstruction has been performed is added to the reference frame list. When the difference is relatively large, the second reference frame is added to the reference frame list. Similarly, a decoded picture exceeding the window is moved out. It should be understood that the preset value may be a same value synchronously set at two ends of a codec according to empirical or experimental data. In some embodiments, the preset value may be synchronously updated at the two ends of the codec according to an actual case. For example, the preset value may be 0.5 or another positive value not greater than 1. This is not limited.

For example, the implementation 4 may be implemented by the following modules a first obtaining module configured to obtain a reference frame list, where the reference frame list includes a candidate reference frame of a first picture frame on which decoding reconstruction has been performed, a second obtaining module configured to obtain regional vertexes of a preset first region in the first picture frame on which decoding reconstruction has been performed, a third obtaining module configured to obtain, in the second reference frame according to the mapping function, scatters having the mapping relationship with the regional vertexes of the first region, a connection module configured to connect, according to a connection relationship between the regional vertexes of the first region, the scatters that are in the second reference frame and that have the mapping relationship with the regional vertexes of the first region, a construction module configured to form a second region using a region encircled by the scatters by means of the connection, a calculation module configured to calculate a ratio of an intersection of areas of the first region and the second region to a union of the areas of the first region and the second region, where the intersection includes an overlapped location region between the first region and the second region, and the union includes the intersection and a non-overlapped location region between the first region and the second region in ranges of the first region and the second region, and a comparison module configured to when the ratio is less than a preset value, add the second reference frame to the reference frame list, otherwise, add the first picture frame on which decoding reconstruction has been performed to the reference frame list.

In some embodiments, the picture frame on which decoding reconstruction has been performed and the second reference frame in the previous embodiment are both added to the reference frame list. For a subsequent to-be-decoded frame, consistent with a plane location of the intersection of the first region and the second region in the previous embodiment, correspondingly, the to-be-decoded frame includes a region in a corresponding intersection and a region outside the corresponding intersection. In an example of a first implementation, for a pixel unit in the region of the to-be-decoded frame in the corresponding intersection, refer to all picture frames that are in the reference frame list and on which decoding reconstruction has been performed, but not refer to the second reference frame in the reference frame list. For a pixel unit in the region of the to-be-decoded frame outside the corresponding intersection, refer to all the picture frames that are in the reference frame list and on which decoding reconstruction has been performed, or refer to the second reference frame in the reference frame list. In an example of a second implementation, for a pixel unit in the region of the to-be-decoded frame in the corresponding intersection, refer to all picture frames that are in the reference frame list and on which decoding reconstruction has been performed, but not refer to the second reference frame in the reference frame list. For a pixel unit in the region of the to-be-decoded frame outside the corresponding intersection, not refer to all the picture frames that are in the reference frame list and on which decoding reconstruction has been performed, but refer to the second reference frame in the reference frame list.

In the foregoing embodiment, only a small quantity of mapping parameters is transmitted at a frame level, and selectivity of reference frames is enriched such that a reference frame is closer to an actual frame, and prediction performed using the reference frame is more accurate, thereby improving encoding efficiency.

Figure 6:
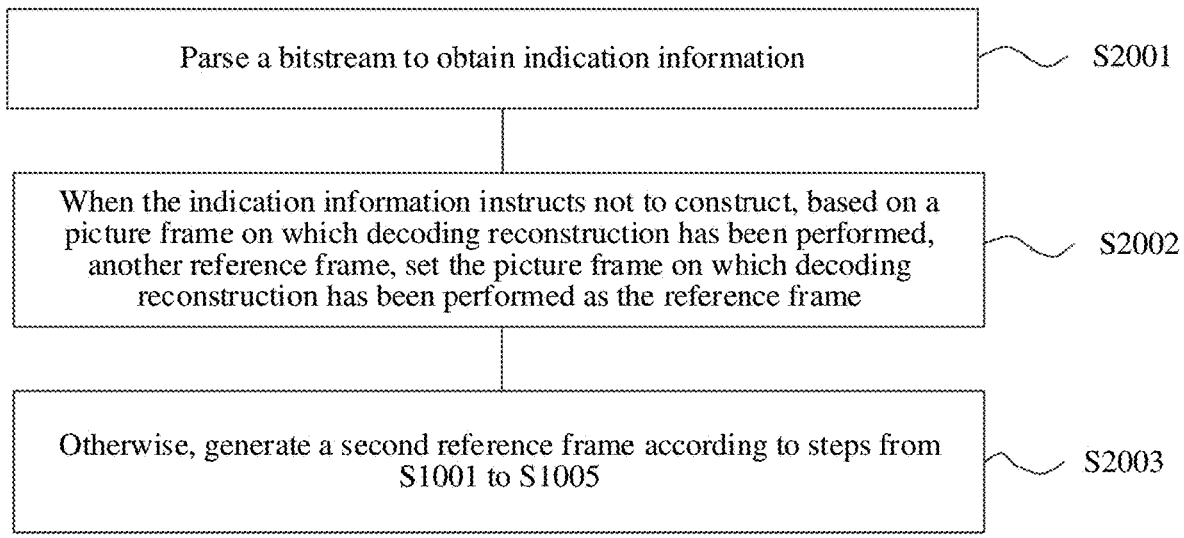
FIG. 6 is a schematic flowchart of another reference frame decoding method according to an embodiment of the present application.

FIG. 6 is a schematic flowchart of another reference frame decoding method 2000 according to an embodiment of the present application. As shown in FIG. 6, the method 2000 includes the following steps.

Step S2001: Parse a bitstream to obtain indication information.

The indication information herein is mainly used to indicate whether the second reference frame generated in step S1005 needs to be generated according to the decoding method 1000.

It should be understood that the indication information is transferred at a frame level, may be transferred in a PPS, may be transferred in a slice, or may be transferred as another frame-level syntactic element. This is not limited.

Step S2002: When the indication information indicates not to construct, based on a picture frame on which decoding reconstruction has been performed, another reference frame, set the picture frame on which decoding reconstruction has been performed as the reference frame.

Step S2003: Otherwise, generate a second reference frame according to steps from S1001 to S1005.

In addition, a reference frame list may be constructed according to the methods described in the foregoing feasible implementations 1 to 4.

In some embodiments, alternatively, the indication information may further be transferred at a sequence level, for example, in an SPS to indicate whether only the picture frame on which decoding reconstruction has been performed is used as a reference frame in an entire belonging sequence. Further, the indication information may indicate information of each frame in the sequence about reference frame construction. For example, indicating a frame number four represents that a reference frame generated according to the method described in the first aspect and the embodiments of the present application is added to the reference frame list, and a number of the reference frame is 4. Alternatively, for example, indicating a binary sequence 011101 represents a case of a construction manner of each frame that is in the sequence and that is added to the reference frame list.

Using the indication information, it is known in advance whether a reference frame generated using the method provided in the first aspect of the present application needs to be generated in order to reduce complexity of the solution.

This embodiment of the present application discloses a reference frame encoding method. Referring to FIG. 2, it may be learned that if a PU is in a slice P, the motion estimation unit 122 may search a reference picture in a reference picture list (for example, a "list 0") for a reference block of the PU. The reference block of the PU may be a pixel block that most closely corresponds to a pixel block of the PU. The motion estimation unit 122 may generate a reference picture index indicating a reference picture that is in the list 0 and that includes the reference block of the PU and a motion vector indicating a spatial displacement between the pixel block of the PU and the reference block. The motion estimation unit 122 may use the reference picture index and the motion vector as motion information of the PU for output. The motion compensation unit 124 may generate, based on the reference block indicated by the motion information of the PU, a predictive pixel block of the PU.

Figure 7:
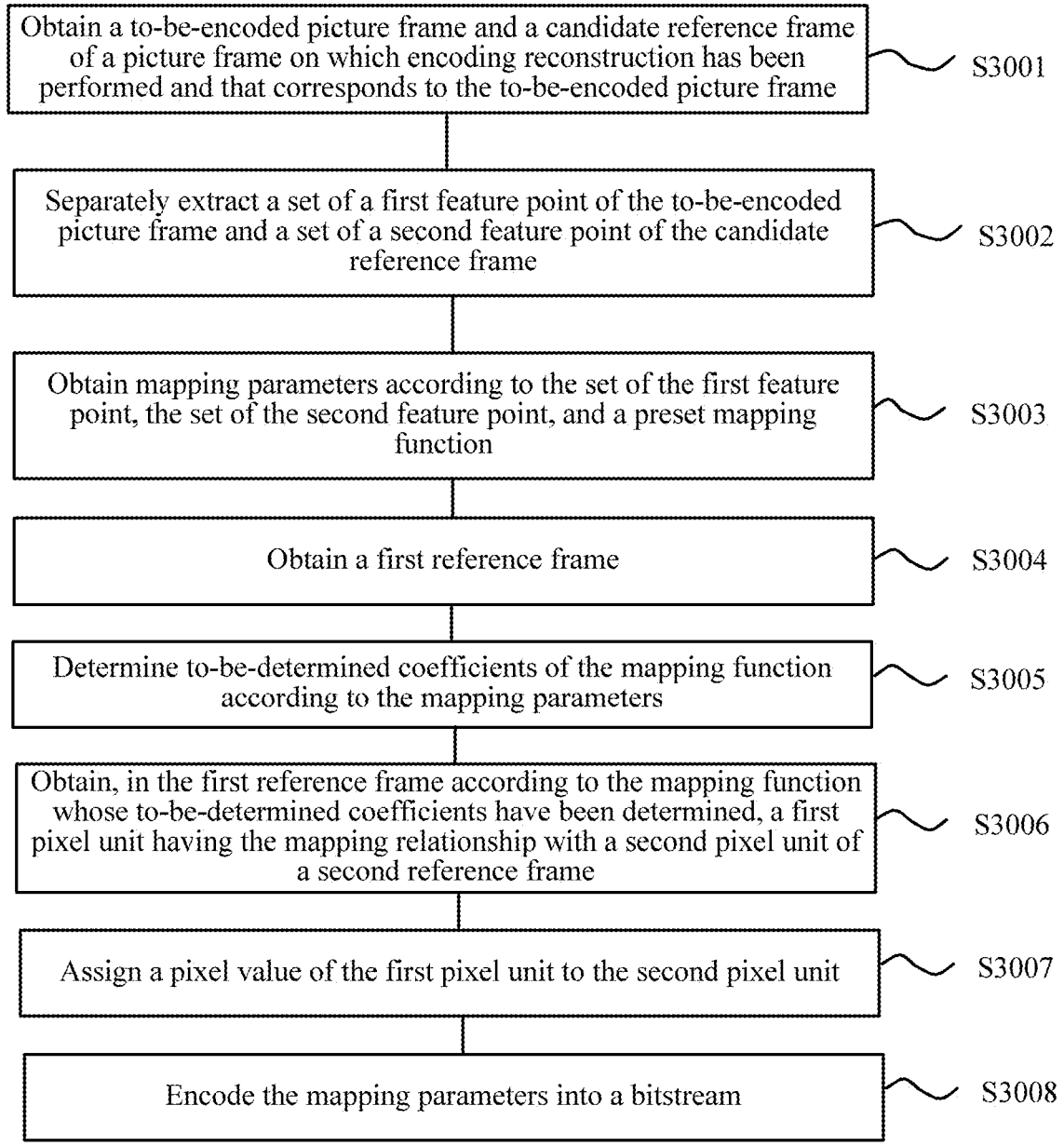
FIG. 7 is a schematic flowchart of a reference frame encoding method according to an embodiment of the present application.

FIG. 7 is a schematic flowchart of a reference frame encoding method 3000 according to an embodiment of the present application. As shown in FIG. 7, the method 3000 includes the following steps.

Step S3001: Obtain a to-be-encoded picture frame and a candidate reference frame of a picture frame on which encoding reconstruction has been performed and that corresponds to the to-be-encoded picture frame.

Step S3002: Separately extract a set of a first feature point of the to-be-encoded picture frame and a set of a second feature point of the candidate reference frame.

Following includes a feasible implementation.

Figure 8:
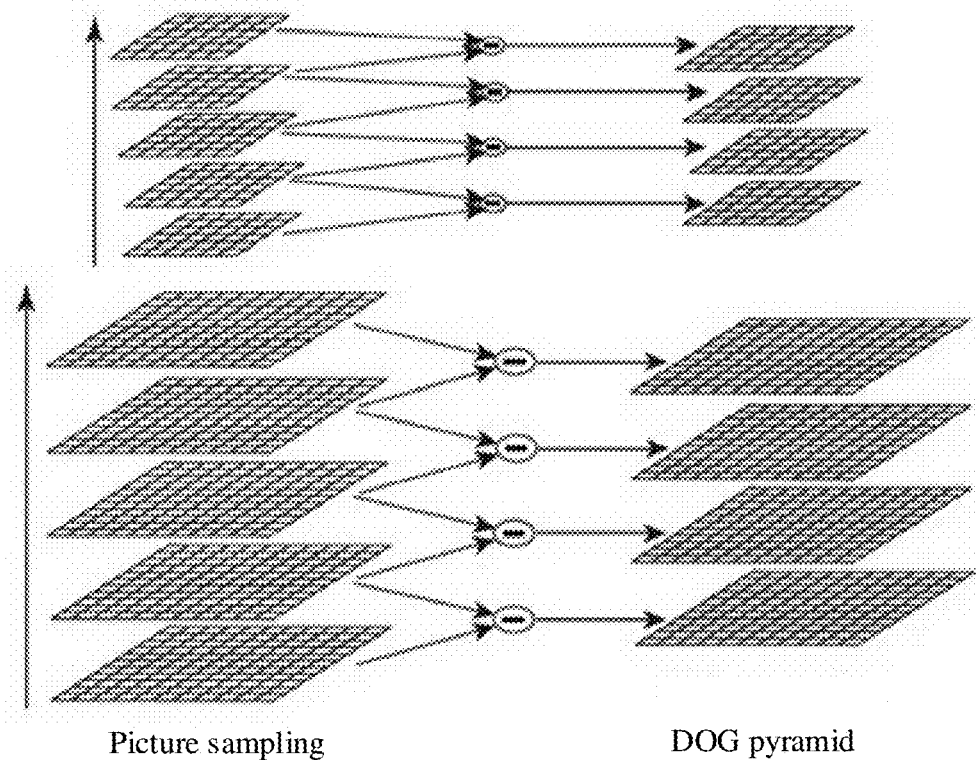
FIG. 8 is a diagram of an example of generation of a difference of Gaussian (DOG) pyramid.
Figure 9:
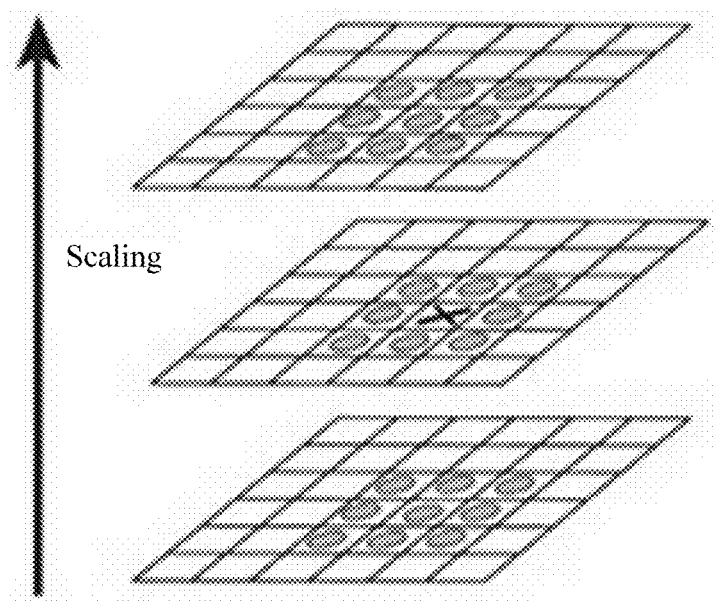
FIG. 9 is a diagram of an example of detection of an extremum point in a DOG space.

First step: A scale-invariant feature transform (SIFT) feature point of the current to-be-encoded frame is extracted. A Gaussian pyramid of a picture is first constructed using a SIFT algorithm. Construction of the Gaussian pyramid includes two parts, performing Gaussian blurring of different scales on the picture and performing point-interval downsampling on the picture. Then, a difference between two neighboring layers of Gaussian pictures is obtained to form a DOG pyramid. The process is shown in FIG. 8. Next, extrema detection is performed in a DOG space. To find an extremum point of a DOG function, each pixel unit is compared with all neighboring points of the pixel unit. If the pixel unit is a maximum value point or a minimum value point, it is preliminarily determined that the pixel unit is a local feature point. As shown in FIG. 9, a detected point in the middle is compared with 26 points in total, eight neighboring points in a same scale as that of the detected point and 9*2 points corresponding to upper and lower neighboring scales in order to ensure that an extremum point is detected in both a scale space and a two-dimensional picture space. To improve matching stability and an anti-noise capability, a low-contrast key point and an unstable edge response point are removed from a set of preliminarily determined feature points. For each remaining local feature point, 16 sub-blocks of a 4*4 size are formed by means of division in a neighboring region of a 16*16 nearby region of the local feature point. A gradient direction histogram in eight directions is calculated for each sub-block, and 16 histograms are spliced together to form a feature vector of 128 dimensions.

Second step: A SIFT feature point of a reference frame of the current to-be-encoded frame is extracted using the same foregoing method.

Third step: Matching is performed between the feature point of the currently to-be-encoded frame and the feature point of the reference frame, to find several feature point matching pairs. An abnormal point is excluded using a random sample consensus (RANSAC) algorithm and according to location information of the matching pairs. A group of transform parameters that meets a largest quantity of matching pairs is found in a manner of random sampling and using the RANSAC algorithm in order to effectively remove an invalid matching pair.

It should be understood that extraction and matching of a feature point may be performed using different methods. This is not limited herein.

Step S3003: Obtain mapping parameters according to the set of the first feature point, the set of the second feature point, and a preset mapping function, where the mapping parameters indicate a mapping relationship between the first feature point and the second feature point under constraint of the mapping function.

In an embodiment, for a valid feature point matching pair obtained in step S3002, each matching pair is formed by a point belonging to the to-be-encoded picture frame, that is, a point in the set of the first feature point, and a point belonging to the candidate reference point, that is, a point in the set of the second feature point. The first feature point may be used as a target pixel unit, and the second feature point matching the first feature point may be used as a source pixel unit. A group of mapping parameters may be obtained according to the method described in step S1003 and under constraint of the corresponding mapping function.

Step S3004: Obtain a first reference frame.

A specific implementation is similar to that in step S1001, and details are not described again.

Step S3005: Determine to-be-determined coefficients of the mapping function according to the mapping parameters.

A specific implementation is similar to that in step S1003, and details are not described again.

Step S3006: Obtain, in the first reference frame according to the mapping function whose to-be-determined coefficients have been determined, a first pixel unit having the mapping relationship with a second pixel unit of a second reference frame.

A specific implementation is similar to that in step S1004, and details are not described again.

Step S3007: Assign a pixel value of the first pixel unit to the second pixel unit.

A specific implementation is similar to that in step S1005, and details are not described again.

Optionally, the mapping parameters may be updated based on an original to-be-encoded picture and the second reference frame generated according to the mapping parameters and steps S3004 to S3007.

In an embodiment, it may be assumed that I'(x', y') and I(x, y) are respectively a picture frame generated in step S3007 and an original picture frame currently to be encoded. An objective is to minimize an error between the picture frame and the original picture frame, that is, set up a minimization error function:

$$E=\Sigma e^2=\Sigma[I'(x',y')-I(x,y)]^2,$$

where $$x' = \frac{m_0 x + m_1 y + m_2}{m_6 x + m_7 y + 1}, y' = \frac{m_3 x + m_4 y + m_5}{m_6 x + m_7 y + 1},$$

and $m_0, m_1, m_2, m_3, m_4, m_5, m_6, m_7$ are the mapping parameters. Optimal mapping parameters are solved using a gradient descent method, including $m^{(t+1)}=m^{(t)}+\Delta m$, $\Delta m = A^{-1}b$, where $$a_{kl} = \sum \frac{\partial e_i}{\partial m_k} \frac{\partial e_i}{\partial m_l}, b_k = -\sum \frac{\partial e_i}{\partial m_k} e_i, \text{ and}$$

$$\frac{\partial e}{\partial m_k} = \frac{\partial I'}{\partial x'} \frac{\partial x'}{\partial m_k} + \frac{\partial I'}{\partial y'} \frac{\partial y'}{\partial m_k}.$$

An iterative calculation is continuously performed until an intensity difference E is less than a threshold or a specified quantity of times of iterative calculations are performed.

After updated mapping parameters are obtained, the second reference frame needs to be generated again according to a process of steps from S3005 to S3007.

Step S3008: Encode the mapping parameters into a bitstream.

The mapping parameters obtained in step S3007, including updated mapping parameters in some embodiments, are all sent to the entropy encoding unit 116 shown in FIG. 2 to perform an entropy encoding process in order to be encoded into the bitstream.

It should be understood that such mapping parameters are transferred at a frame level, may be transferred in a PPS, may be transferred in a slice header, or may be transferred as another frame-level syntactic element. This is not limited.

Corresponding to a decoder side, in various different feasible implementations of constructing a reference frame list, after an adaptive change, for example, an operation on a picture on which decoding reconstruction has been performed is replaced with an operation that is on a picture on which encoding reconstruction has been performed and that has an equivalent physical meaning on an encoder side, and parsing a bitstream to obtain a syntactic element is replaced with encoding a syntactic element into a bitstream, the feasible implementations 1 to 4 of constructing the reference frame list on the decoder side may also be applied to the encoder side, and details are not described herein again.

In the foregoing embodiment, only a small quantity of mapping parameters is transmitted at a frame level, and selectivity of reference frames is enriched such that a reference frame is closer to an actual frame, and prediction performed using the reference frame is more accurate, thereby improving encoding efficiency.

Figure 10:
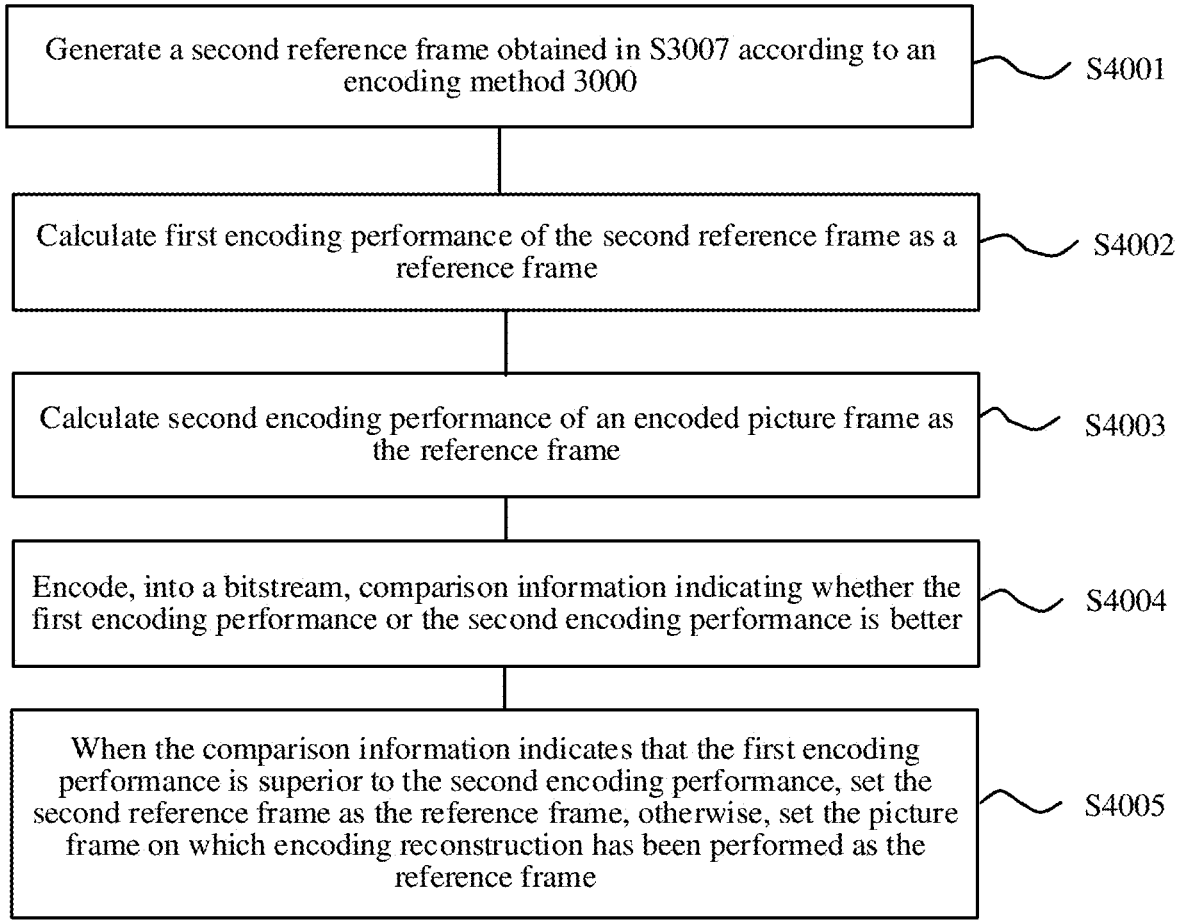
FIG. 10 is a schematic flowchart of another reference frame encoding method according to an embodiment of the present application.

FIG. 10 is a schematic flowchart of another reference frame encoding method 4000 according to an embodiment of the present application. As shown in FIG. 10, the method 4000 includes the following steps.

Step S4001: Generate a second reference frame obtained in step S3007 according to the encoding method 3000.

Step S4002: Calculate first encoding performance of the second reference frame as the reference frame.

Step S4003: Calculate second encoding performance of an encoded picture frame as the reference frame.

It should be understood that the foregoing encoding performance test is a process of encoding quality-encoding cost (distortion-rate) selection. Comparison may be performed according to accurate encoding quality and an accurate quantity of encoding bits or may be performed in a simplified manner. For example, only a quantity of encoding bits is tested. This is not limited. The prediction processing unit 100 in FIG. 2 further performs a function of encoding performance calculation, and details are not described herein.

Step S4004: Encode, into a bitstream, comparison information indicating whether the first encoding performance or the second encoding performance is better.

The step corresponds to step S2001. If the first encoding performance is better, it means that the reference frame needs to be generated using the encoding method 3000, otherwise, it means that only a picture on which encoding reconstruction has been performed needs to be used as the reference frame.

Step S4005: When the comparison information indicates that the first encoding performance is superior to the second encoding performance, set the second reference frame as the reference frame, otherwise, set the picture frame on which encoding reconstruction has been performed as the reference frame.

Similarly, corresponding to a decoder side, in various different feasible implementations of constructing a reference frame list, after an adaptive change, for example, an operation on a picture on which decoding reconstruction has been performed is replaced with an operation that is on a picture on which encoding reconstruction has been performed and that has an equivalent physical meaning on an encoder side, and parsing a bitstream to obtain a syntactic element is replaced with encoding a syntactic element into a bitstream, the feasible implementations 1 to 4 of constructing the reference frame list on the decoder side may also be applied to the encoder side, and details are not described herein again.

Using indication information, it is known in advance whether a reference frame generated using the method provided in the first aspect of the present application needs to be generated in order to reduce complexity of the solution.

Figure 11:
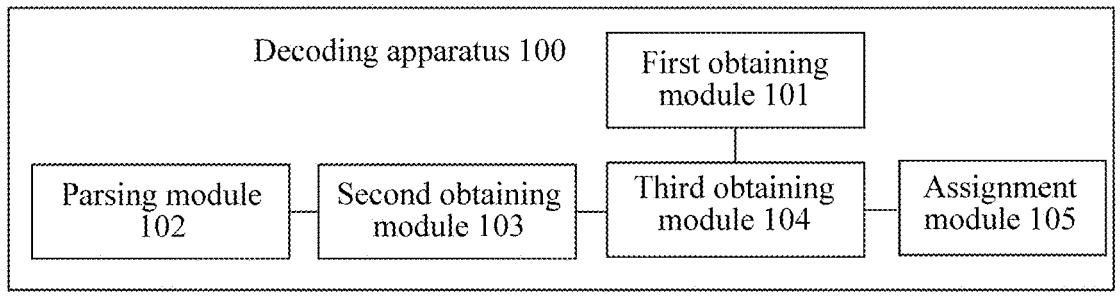
FIG. 11 is a schematic block diagram of a reference frame decoding apparatus according to an embodiment of the present application.

FIG. 11 is a schematic block diagram of a reference frame decoding apparatus 100 according to an embodiment of the present application.

A first obtaining module 101 is configured to obtain a first reference frame, where the first reference frame is a first picture frame on which decoding reconstruction has been performed or a first interpolated picture frame obtained by means of pixel interpolation on the first picture frame.

A parsing module 102 is configured to parse a bitstream to obtain mapping parameters.

A second obtaining module 103 is configured to determine to-be-determined coefficients of a preset mapping function according to the mapping parameters.

A third obtaining module 104 is configured to obtain, in the first reference frame according to the mapping function whose to-be-determined coefficients have been determined, a first pixel unit having a mapping relationship with a second pixel unit of a second reference frame.

An assignment module 105 is configured to assign a pixel value of the first pixel unit to the second pixel unit.

The decoding apparatus 100 corresponds to the decoding method 1000. Further, the first obtaining module 101, the parsing module 102, the second obtaining module 103, the third obtaining module 104, and the assignment module 105 respectively perform operations in steps S1001, S1002, S1003, S1004, and S1005, and details are not described again.

Figure 12:
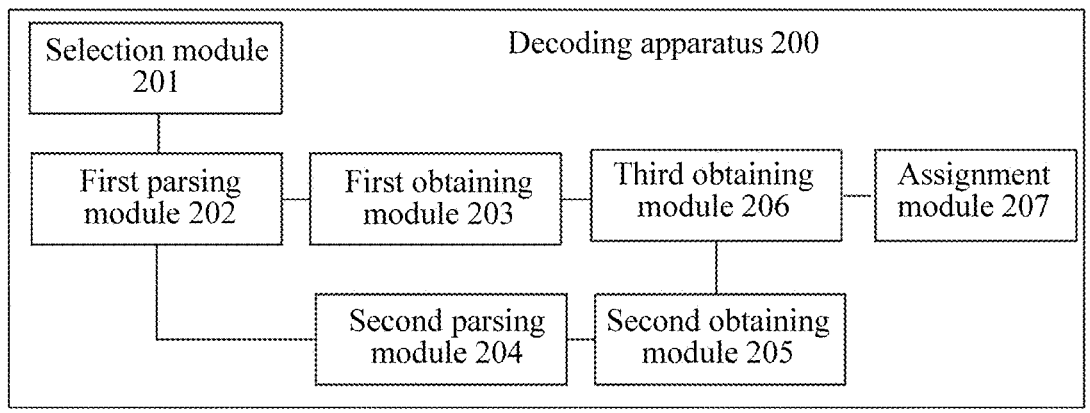
FIG. 12 is a schematic block diagram of another reference frame decoding apparatus according to an embodiment of the present application.

FIG. 12 is a schematic block diagram of another reference frame decoding apparatus 200 according to an embodiment of the present application.

A first parsing module 202 is configured to parse a bitstream to obtain indication information.

A selection module 201 is configured to, when the indication information indicates not to construct, based on a picture frame on which decoding reconstruction has been performed, another reference frame, set the picture frame on which decoding reconstruction has been performed as the reference frame, otherwise, set the following method to obtain the reference frame.

A first obtaining module 203 is configured to obtain a first reference frame, where the first reference frame is the picture frame on which decoding reconstruction has been performed or an interpolated picture frame obtained by means of pixel interpolation on the picture frame.

A second parsing module 204 is configured to parse the bitstream to obtain mapping parameters.

A second obtaining module 205 is configured to determine to-be-determined coefficients of a preset mapping function according to the mapping parameters.

A third obtaining module 206 is configured to obtain, in the first reference frame according to the mapping function whose to-be-determined coefficients have been determined, a first pixel unit having a mapping relationship with a second pixel unit of a second reference frame.

An assignment module 207 is configured to assign a pixel value of the first pixel unit to the second pixel unit.

The decoding apparatus 200 corresponds to the decoding method 2000. Further, the first parsing module 202 performs step S2001. Further, the selection module 201, the first obtaining module 203, the second parsing module 204, the second obtaining module 205, the third obtaining module 206, and the assignment module 207 jointly perform the operations in steps S2002 and S2003, and details are not described again.

Figure 13:
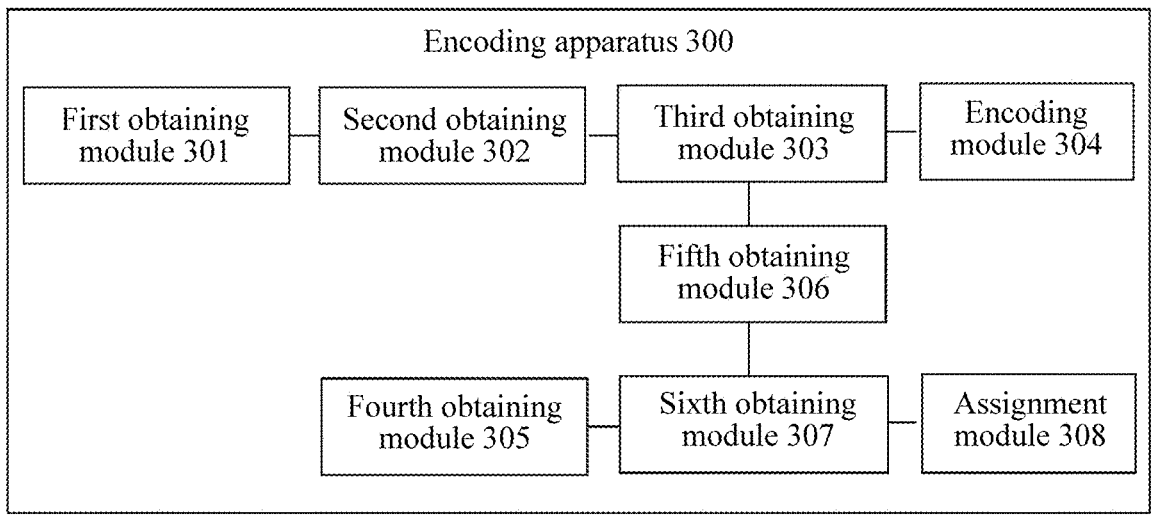
FIG. 13 is a schematic block diagram of a reference frame encoding apparatus according to an embodiment of the present application.

FIG. 13 is a schematic block diagram of a reference frame encoding apparatus 300 according to an embodiment of the present application.

A first obtaining module 301 is configured to obtain a to-be-encoded picture frame and a candidate reference frame of a picture frame on which encoding reconstruction has been performed and that corresponds to the to-be-encoded picture frame.

A second obtaining module 302 is configured to separately extract a set of a first feature point of the to-be-encoded picture frame and a set of a second feature point of the candidate reference frame.

A third obtaining module 303 is configured to obtain mapping parameters according to the set of the first feature point, the set of the second feature point, and a preset mapping function, where the mapping parameters indicate a mapping relationship between the first feature point and the second feature point under constraint of the mapping function.

An encoding module 304 is configured to encode the mapping parameters into a bitstream.

A fourth obtaining module 305 is configured to obtain a first reference frame, where the first reference frame is a first picture frame on which encoding reconstruction has been performed or a first interpolated picture frame obtained by means of pixel interpolation on the first picture frame.

A fifth obtaining module 306 is configured to determine to-be-determined coefficients of the mapping function according to the mapping parameters.

A sixth obtaining module 307 is configured to obtain, in the first reference frame according to the mapping function whose to-be-determined coefficients have been determined, a first pixel unit having the mapping relationship with a second pixel unit of a second reference frame.

An assignment module 308 is configured to assign a pixel value of the first pixel unit to the second pixel unit.

The encoding apparatus 300 corresponds to the encoding method 3000. Further, the first obtaining module 301, the second obtaining module 302, the third obtaining module 303, the encoding module 304, the fourth obtaining module 305, the fifth obtaining module 306, the sixth obtaining module 307, and the assignment module 308 respectively perform operations in steps S3001, S3002, S3003, S3005, S3006, S3007, S3008, and S3004, and details are not described again.

Figure 14:
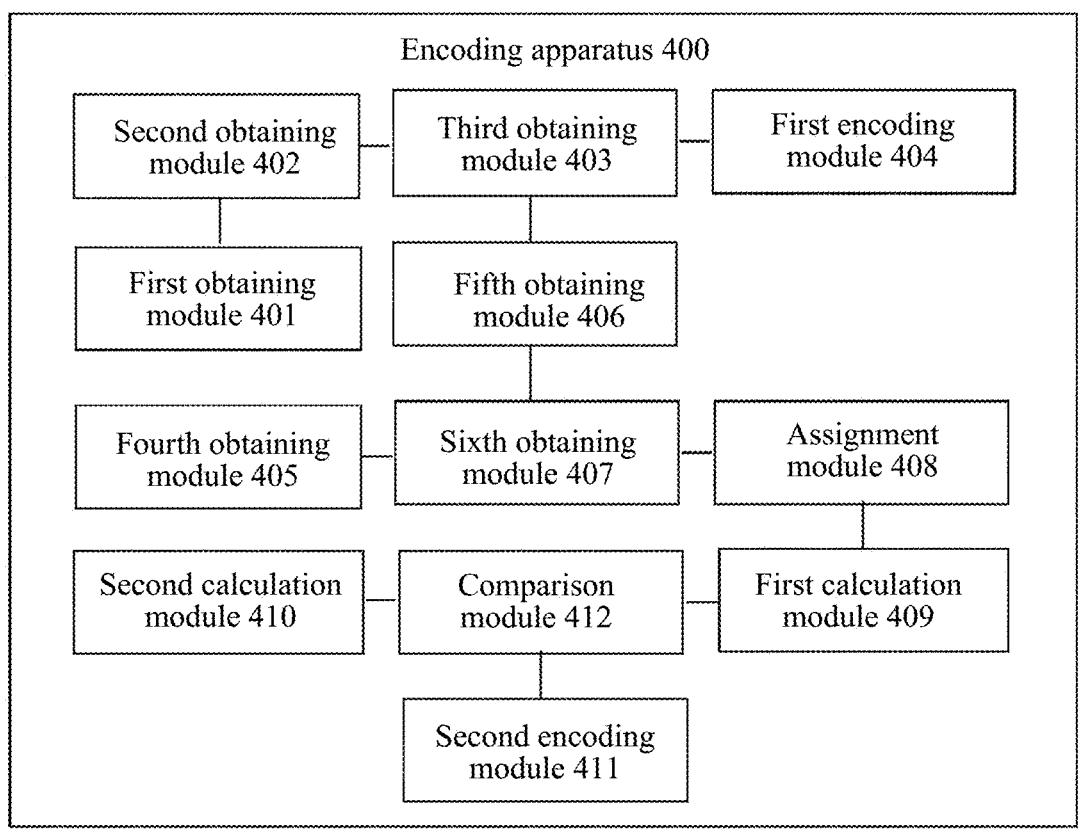
FIG. 14 is a schematic block diagram of another reference frame encoding apparatus according to an embodiment of the present application.

FIG. 14 is a schematic block diagram of another reference frame encoding apparatus 400 according to an embodiment of the present application.

A first obtaining module 401 is configured to obtain a to-be-encoded picture frame and a candidate reference frame of a picture frame on which encoding reconstruction has been performed and that corresponds to the to-be-encoded picture frame.

A second obtaining module 402 is configured to separately extract a set of a first feature point of the to-be-encoded picture frame and a set of a second feature point of the candidate reference frame.

A third obtaining module 403 is configured to obtain mapping parameters according to the set of the first feature point, the set of the second feature point, and a preset mapping function, where the mapping parameters indicate a mapping relationship between the first feature point and the second feature point under constraint of the mapping function.

A first encoding module 404 is configured to encode the mapping parameters into a bitstream.

A fourth obtaining module 405 is configured to obtain a first reference frame, where the first reference frame is a first picture frame on which encoding reconstruction has been performed or a first interpolated picture frame obtained by means of pixel interpolation on the first picture frame.

A fifth obtaining module 406 is configured to determine to-be-determined coefficients of the mapping function according to the mapping parameters.

A sixth obtaining module 407 is configured to obtain, in the first reference frame according to the mapping function whose to-be-determined coefficients have been determined, a first pixel unit having the mapping relationship with a second pixel unit of a second reference frame.

An assignment module 408 is configured to assign a pixel value of the first pixel unit to the second pixel unit.

A first calculation module 409 is configured to calculate first encoding performance of the second reference frame as the reference frame.

A second calculation module 410 is configured to calculate second encoding performance of the encoded picture frame as the reference frame.

A second encoding module 411 is configured to encode comparison information of the first encoding performance and the second encoding performance into the bitstream.

A comparison module 412 is configured to set the second reference frame as the reference frame when the comparison information indicates that the first encoding performance is superior to the second encoding performance, otherwise, set the picture frame on which encoding reconstruction has been performed as the reference frame.

The encoding apparatus 400 corresponds to the encoding method 4000. Further, the first obtaining module 401, the second obtaining module 402, the third obtaining module 403, the first encoding module 404, the fourth obtaining module 405, the fifth obtaining module 406, the sixth obtaining module 407, and the assignment module 408 jointly perform the operation in step S4001. Further, the first calculation module 409, the second calculation module 410, the second encoding module 411, and the comparison module 412 respectively perform operations in steps S4002, S4003, S4004, and S4005, and details are not described again.

In conclusion, in the foregoing embodiment, only a small quantity of mapping parameters, comparison information, or indication information is transmitted at a frame level, and selectivity of reference frames is enriched such that a reference frame is closer to an actual frame, and prediction performed using the reference frame is more accurate, thereby improving encoding efficiency. In addition, when construction information of a reference frame is obtained in advance, a decoder side may not perform additional reference frame construction, thereby reducing complexity of the solution.

In one or more embodiments, the described functions may be implemented by hardware, software, firmware, or any combination thereof. If the functions are implemented by the software, the functions may be stored in a computer readable medium as one or more instructions or source code, or sent by a computer readable medium, and executed by a processing unit based on the hardware. The computer readable medium may include a computer readable storage medium (which corresponds to a tangible medium such as a data storage medium) or a communications medium, and the communications medium includes, for example, any medium that promotes transmission of data, using a computer program, from a place to another place according to a communication protocol. In this manner, the computer readable medium may be generally corresponding to: (1) a non-transitory tangible computer readable storage medium, or (2) a communications medium such as a signal or a carrier. The data storage medium may be accessed by one or more computers or one or more processors to retrieve an instruction, code, and/or a data structure for implementing any available medium in technologies described in the present application. A computer program product may include a computer readable medium.

By way of example and not limitation, some computer readable storage media may include a random access memory (RAM), a read-only memory (ROM), an electrically erasable programmable ROM (EEPROM), a CD-ROM, another optical disc storage or magnetic disk storage, another magnetic storage apparatus, a flash memory, or any other medium that can store needed program code in a form of an instruction or a data structure and can be accessed by a computer. In addition, any connection may be appropriately referred to as a computer readable medium. For example, if an instruction is sent from a website, a server, or another remote source using a coaxial cable, an optical cable, a twisted pair, a DSL, or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer readable storage medium and the data storage medium may not include a connection, a carrier, a signal, or another transitory medium, but are non-transitory tangible storage media. A disk and an optical disc used in this specification include a compact disc (CD), a laser disc, an optical disc, a DVD, a FLOPPY DISK, and a BLU-RAY DISK, where the disk generally magnetically copies data, and the optical disc optically copies data using a laser. A combination of the foregoing objects shall further be included in the scope of the computer readable medium.

An instruction may be executed by one or more processors such as one or more DSP, a general microprocessor, an ASIC, an FPGA, or another equivalent integrated circuit or discrete logic circuit. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements.

The technologies in the present application may be widely implemented by multiple apparatuses or devices. The apparatuses or devices include a radio handset, an integrated circuit (IC), or an IC set (for example, a chip set). In the present application, various components, modules, and units are described to emphasize functions of an apparatus that is configured to implement the disclosed technologies, and the functions do not necessarily need to be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "one embodiment" or "an embodiment" mentioned in the whole specification does not mean that particular features, structures, or characteristics related to the embodiment are included in at least one embodiment of the present application. Therefore, "in one embodiment" or "in an embodiment" appearing throughout the specification does not refer to a same embodiment. In addition, these particular features, structures, or characteristics may be combined in one or more embodiments using any appropriate manner.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. The term "and/or" in this specification describes only an association relationship for describing associated objects and represents that three relationships may exist. For example, A and/or B may represent the following three cases, only A exists, both A and B exist, and only B exists. In addition, the character "I" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A reference frame decoding method, comprising:
    obtaining, by a video decoding device, a first reference frame comprising a first picture frame on which decoding reconstruction has been performed or a first interpolated picture frame obtained by pixel interpolation on the first picture frame;
    parsing, by the video decoding device, a bitstream to obtain mapping parameters;
    determining, by the video decoding device, to-be-determined coefficients of a preset mapping function according to the mapping parameters;
    obtaining, by the video decoding device in the first reference frame according to the preset mapping function, a first pixel unit having a mapping relationship with a second pixel unit of a second reference frame;
    assigning, by the video decoding device, a pixel value of the first pixel unit to the second pixel unit to construct the second reference frame;
    obtaining, by the video decoding device, a reference frame list comprising a candidate reference frame of the first picture frame on which the decoding reconstruction has been performed;
    obtaining, by the video decoding device, regional vertexes of a preset first region in the first picture frame on which the decoding reconstruction has been performed;
    obtaining, by the video decoding device in the second reference frame according to the preset mapping function, scatters having the mapping relationship with the regional vertexes of the preset first region;
    coupling, by the video decoding device according to a coupling relationship between the regional vertexes of the preset first region, the scatters in the second reference frame having the mapping relationship with the regional vertexes of the preset first region;
    forming, by the video decoding device, a second region using a region encircled by the coupled scatters;
    calculating, by the video decoding device, a ratio of an intersection of areas of the preset first region and the second region to a union of the areas of the preset first region and the second region, wherein the intersection comprises an overlapped location region between the preset first region and the second region, and wherein the union comprises the intersection and a non-overlapped location region between the preset first region and the second region in ranges of the preset first region and the second region;
    adding, by the video decoding device, the second reference frame to the reference frame list when the ratio is less than a preset value; and
    adding, by the video decoding device, the first picture frame on which the decoding reconstruction has been performed to the reference frame list when the ratio is greater than or equal to the preset value.

2. The reference frame decoding method of claim 1, wherein the preset mapping function comprises $x'=m_0x+m_1y+m_2$, $y'=m_3x+m_4y+m_5$, wherein, a location of the first pixel unit is $x'=m_0x+m_1y+m_2$, $y'=m_3x+m_4y+m_5$, wherein x, y are a horizontal coordinate and a vertical coordinate of the second pixel unit, wherein x', y' are a horizontal coordinate and a vertical coordinate of the first pixel unit having the mapping relationship with the second pixel unit, and wherein $m_0,m_1,m_2,m_3,m_4,m_5$ are the to-be-determined coefficients of the preset mapping function determined according to the mapping parameters.

3. The reference frame decoding method of claim 1, further comprising:
    obtaining, by the video decoding device, a third reference frame comprising a second picture frame on which the decoding reconstruction has been performed or a second interpolated picture frame obtained by the pixel interpolation on the second picture frame;
    obtaining, by the video decoding device in the third reference frame according to the preset mapping function whose the to-be-determined coefficients have been determined, a third pixel unit having the mapping relationship with a fourth pixel unit of a fourth reference frame; and
    assigning, by the video decoding device, a pixel value of the third pixel unit to the fourth pixel unit.

4. The reference frame decoding method of claim 3, wherein, a location of the third pixel unit comprises $x'=m_0x+m_1y+m_2$, $y'=m_3x+m_4y+m_5$, wherein x, y are a horizontal coordinate and a vertical coordinate of the fourth pixel unit, wherein x', y' are a horizontal coordinate and a vertical coordinate of the third pixel unit having the mapping relationship with the fourth pixel unit, and wherein $m_0,m_1,m_2,m_3,m_4,m_5$ are the to-be-determined coefficients of the preset mapping function determined according to the mapping parameters.

5. The reference frame decoding method of claim 3, further comprising:
    obtaining, by the video decoding device, a reference frame list comprising a candidate reference frame of the second picture frame on which the decoding reconstruction has been performed;
    performing, by the video decoding device, weighted addition on a pixel unit of the second reference frame and a pixel unit in a same location in the fourth reference frame to obtain a fifth reference frame; and
    adding, by the video decoding device, the second picture frame on which the decoding reconstruction has been performed or the fifth reference frame to the reference frame list.

6. The reference frame decoding method of claim 1, wherein obtaining the scatters comprises obtaining, by the video decoding device, locations of the scatters as $$x' = \frac{-m_4x + m_1y + m_2m_4 - m_1m_5}{m_1m_3 - m_0m_4},$$

-continued $$y' = \frac{m_3 x + m_0 y + m_0 m_5 - m_2 m_3}{m_1 m_3 - m_0 m_4}$$

in the second reference frame, wherein x, y are a horizontal coordinate and a vertical coordinate of the regional vertex of the preset first region, wherein x', y' are a horizontal coordinate and a vertical coordinate of a scatter having the mapping relationship with the regional vertex of the preset first region, and wherein $m_0, m_1, m_2, m_3, m_4, m_5$ are the to-be-determined coefficients of the preset mapping function determined according to the mapping parameters.

7. The reference frame decoding method of claim 1, wherein the preset mapping function is obtained according to an empirical data or an experimental data.

8. The reference frame decoding method of claim 1, further comprising:
obtaining, by the video decoding device, a reference frame list comprising a candidate reference frame of the first picture frame on which the decoding reconstruction has been performed; and
adding, by the video decoding device, the first picture frame on which the decoding reconstruction has been performed and the second reference frame to the reference frame list, wherein a location of the first picture frame on which the decoding reconstruction has been performed being adjacent to a location of the second reference frame in the reference frame list.

9. A reference frame decoding method, comprising:
parsing, by a video decoding device, a bitstream to obtain indication information;
setting, by the video decoding device, a picture frame on which decoding reconstruction has been performed as the reference frame when the indication information indicates not to construct another reference frame based on the picture frame on which the decoding reconstruction has been performed;
obtaining, by the video decoding device, a first reference frame when the indication information indicates to construct the other reference frame based on the picture frame on which the decoding reconstruction has been performed, wherein the first reference frame comprising the picture frame on which the decoding reconstruction has been performed or an interpolated picture frame obtained by pixel interpolation on the picture frame;
parsing, by the video decoding device, the bitstream to obtain mapping parameters;
determining, by the video decoding device, to-be-determined coefficients of a preset mapping function according to the mapping parameters;
obtaining, by the video decoding device in the first reference frame according to the preset mapping function whose the to-be-determined coefficients have been determined, a first pixel unit having a mapping relationship with a second pixel unit of a second reference frame; and
assigning, by the video decoding device, a pixel value of the first pixel unit to the second pixel unit to construct the second reference frame.

10. The reference frame decoding method of claim 9, wherein the preset mapping function comprises $x'=m_0 x + m_1 y + m_2$, $y'=m_3 x + m_4 y + m_5$, wherein a location of the first pixel unit comprises $x'=m_0 x + m_1 y + m_2$, $y'=m_3 x + m_4 y + m_5$, wherein x, y are a horizontal coordinate and a vertical coordinate of the second pixel unit, wherein x', y' are a horizontal coordinate and a vertical coordinate of the first pixel unit having the mapping relationship with the second pixel unit, and wherein $m_0, m_1, m_2, m_3, m_4, m_5$ are the to-be-determined coefficients of the preset mapping function determined according to the mapping parameters.

11. The reference frame decoding method of claim 9, wherein the indication information is transferred at a frame level.

12. The reference frame decoding method of claim 9, wherein the indication information is transferred at a sequence level.

13. A reference frame decoding apparatus, comprising:
a memory storing instructions; and
a processor coupled to the memory, the instructions causing the processor to be configured to:
obtain a first reference frame comprising a first picture frame on which decoding reconstruction has been performed or a first interpolated picture frame obtained by pixel interpolation on the first picture frame;
parse a bitstream to obtain mapping parameters;
determine to-be-determined coefficients of a preset mapping function according to the mapping parameters;
obtain, in the first reference frame according to the preset mapping function whose the to-be-determined coefficients have been determined, a first pixel unit having a mapping relationship with a second pixel unit of a second reference frame;
assign a pixel value of the first pixel unit to the second pixel unit to construct the second reference frame;
obtain a reference frame list comprising a candidate reference frame of the first picture frame on which the decoding reconstruction has been performed;
obtain regional vertexes of a preset first region in the first picture frame on which the decoding reconstruction has been performed;
obtain, in the second reference frame according to the preset mapping function, scatters having the mapping relationship with the regional vertexes of the preset first region;
couple, according to a coupling relationship between the regional vertexes of the preset first region, the scatters in the second reference frame having the mapping relationship with the regional vertexes of the preset first region;
form a second region using a region encircled by the coupled scatters;
calculate a ratio of an intersection of areas of the preset first region and the second region to a union of the areas of the preset first region and the second region, wherein the intersection comprises an overlapped location region between the preset first region and the second region, and wherein the union comprises the intersection and a non-overlapped location region between the preset first region and the second region in ranges of the preset first region and the second region;
add the second reference frame to the reference frame list when the ratio is less than a preset value; and
add the first picture frame on which the decoding reconstruction has been performed to the reference frame list when the ratio is greater than or equal to the preset value.

14. The reference frame decoding apparatus of claim 13, wherein the preset mapping function comprises $x'=m_0 x + m_1 y + m_2$, $y'=m_3 x + m_4 y + m_5$, the instructions further cause the processor to be configured to determine, in the first reference frame, that a location of the first pixel unit comprises $x'=m_0x+m_1y+m_2$, $y'=m_3x+m_4y+m_5$, wherein x, y are a horizontal coordinate and a vertical coordinate of the second pixel unit, wherein x', y' are a horizontal coordinate and a vertical coordinate of the first pixel unit having the mapping relationship with the second pixel unit, and wherein $m_0,m_1,m_2,m_3,m_4,m_5$ are the to-be-determined coefficients of the preset mapping function determined according to the mapping parameters.

15. The reference frame decoding apparatus of claim 13, wherein the instructions further cause the processor to be configured to:
   obtain a third reference frame comprising a second picture frame on which the decoding reconstruction has been performed or a second interpolated picture frame obtained by the pixel interpolation on the second picture frame;
   obtain, in the third reference frame according to the preset mapping function whose the to-be-determined coefficients have been determined, a third pixel unit having the mapping relationship with a fourth pixel unit of a fourth reference frame; and
   assign a pixel value of the third pixel unit to the fourth pixel unit.

16. The reference frame decoding apparatus of claim 15, wherein the instructions further cause the processor to be configured to determine, in the third reference frame, that a location of the third pixel unit comprises $x'=m_0x+m_1y+m_2$, $y'=m_3x+m_4y+m_5$, wherein x, y are a horizontal coordinate and a vertical coordinate of the fourth pixel unit, wherein x', y' are a horizontal coordinate and a vertical coordinate of the third pixel unit having the mapping relationship with the fourth pixel unit, and wherein $m_0,m_1,m_2,m_3,m_4,m_5$ are the to-be-determined coefficients of the preset mapping function determined according to the mapping parameters.

17. The reference frame decoding apparatus of claim 15, wherein the instructions further cause the processor to be configured to:
   obtain a reference frame list comprising a candidate reference frame of the second picture frame on which the decoding reconstruction has been performed;
   perform weighted addition on a pixel unit of the second reference frame and a pixel unit in a same location in the fourth reference frame to obtain a fifth reference frame; and
   add the second picture frame on which the decoding reconstruction has been performed or the fifth reference frame to the reference frame list.

18. The reference frame decoding apparatus of claim 13, wherein the instructions further cause the processor to be configured to obtain locations of the scatters as $$x' = \frac{-m_4 x + m_1 y + m_2 m_4 - m_1 m_5}{m_1 m_3 - m_0 m_4},$$

$$y' = \frac{m_3 x + m_0 y + m_0 m_5 - m_2 m_3}{m_1 m_3 - m_0 m_4}$$

in the second reference frame, wherein x, y are a horizontal coordinate and a vertical coordinate of the regional vertex of the preset first region, wherein x', y' are a horizontal coordinate and a vertical coordinate of a scatter having the mapping relationship with the regional vertex of the first region, and wherein $m_0,m_1,m_2,m_3,m_4,m_5$ are the to-be-determined coefficients of the preset mapping function determined according to the mapping parameters.

19. The reference frame decoding apparatus of claim 13, wherein the preset mapping function is obtained according to an empirical data or an experimental data.

20. The reference frame decoding apparatus of claim 13, wherein the instructions further cause the processor to be configured to:
   obtain, by the video decoding device, a reference frame list comprising a candidate reference frame of the first picture frame on which the decoding reconstruction has been performed; and
   add, by the video decoding device, the first picture frame on which the decoding reconstruction has been performed and the second reference frame to the reference frame list, wherein a location of the first picture frame on which the decoding reconstruction has been performed being adjacent to a location of the second reference frame in the reference frame list.

* * * * *